US008909977B2

(12) United States Patent
Morosan et al.

(10) Patent No.: US 8,909,977 B2
(45) Date of Patent: Dec. 9, 2014

(54) FAILOVER SYSTEM AND METHOD

(71) Applicant: TSX Inc., Toronto (CA)

(72) Inventors: Tudor Morosan, Toronto (CA);
Gregory A. Allen, Oakville (CA);
Viktor Pavlenko, Burlington (CA);
Benson Sze-Kit Lam, Mississauga (CA)

(73) Assignee: TSX Inc., Toronto (CA)

(*) Notice: Subject to any disclaimer, the term of this patent is extended or adjusted under 35 U.S.C. 154(b) by 0 days.

(21) Appl. No.: 14/144,779

(22) Filed: Dec. 31, 2013

(65) Prior Publication Data
US 2014/0115380 A1 Apr. 24, 2014

Related U.S. Application Data

(63) Continuation of application No. 13/114,578, filed on May 24, 2011, now Pat. No. 8,683,257, which is a continuation of application No. 12/757,186, filed on Apr. 9, 2010, now Pat. No. 7,975,174, which is a continuation of application No. 11/498,802, filed on Aug. 4, 2006, now Pat. No. 7,725,764.

(51) Int. Cl.
*G06F 11/00* (2006.01)
*G06F 11/20* (2006.01)
*G06Q 40/00* (2012.01)
*G06Q 40/04* (2012.01)

(52) U.S. Cl.
CPC ........ *G06F 11/2023* (2013.01); *G06F 11/2028* (2013.01); *G06F 11/2097* (2013.01); *G06Q 40/00* (2013.01); *G06Q 40/04* (2013.01); *G06F 11/2038* (2013.01); *G06F 11/2048* (2013.01)
USPC .......... 714/4.11; 705/37; 714/4.12; 714/6.23; 714/6.3

(58) Field of Classification Search
USPC ........... 705/37; 714/4, 6, 13, 4.11, 4.12, 6.23, 714/6.3
See application file for complete search history.

(56) References Cited

U.S. PATENT DOCUMENTS 5,157,663 A * 10/1992 Major et al. .................... 714/10
5,305,200 A * 4/1994 Hartheimer et al. ............ 705/37
(Continued)

FOREIGN PATENT DOCUMENTS

| JP | H6-504389 A | 5/1994 |
| JP | H8-272753 A | 10/1996 |
| WO | WO 92/05487 A1 | 4/1992 |

OTHER PUBLICATIONS

Japanese Patent Application No. 2013-136434 Office Action dated Jan. 7, 2014 with English Translation.

(Continued)

*Primary Examiner* — Joshua P Lottich
(74) *Attorney, Agent, or Firm* — Perry + Currier Inc.

(57) ABSTRACT

One aspect of the present invention provides a system for failover comprising at least one client selectively connectable to one of at least two interconnected server via a network connection. In a normal state, one of the servers is designated a primary server when connected to the client and a remainder of the servers are designated as backup servers when not connected to the client. The at least one client is configured to send messages to the primary server. The servers are configured to process the messages using at least one service that is identical in each of the servers. The services are unaware of whether a server respective to the service is operating as the primary server or the backup server. The servers are further configured to maintain a library, or the like, that indicates whether a server is the primary server or a server is the backup server. The services within each server are to make external calls via its respective library. The library in the primary server is configured to complete the external calls and return results of the external calls to the service in the primary server and to forward results of the external calls to the service in the backup server. The library in the secondary server does not make external calls but simply forwards the results of the external calls, as received from the primary server, to the service in the secondary server when requested to do so by the service in the secondary server.

18 Claims, 19 Drawing Sheets

(56) References Cited

U.S. PATENT DOCUMENTS

| | | | | |
|---|---|---|---|---|
| 5,339,392 | A * | 8/1994 | Risberg et al. | 715/762 |
| 5,381,545 | A * | 1/1995 | Baker et al. | 714/19 |
| 5,437,022 | A * | 7/1995 | Beardsley et al. | 714/6.1 |
| 5,596,706 | A * | 1/1997 | Shimazaki et al. | 714/6.3 |
| 5,713,017 | A * | 1/1998 | Lin et al. | 1/1 |
| 5,727,165 | A * | 3/1998 | Ordish et al. | 705/37 |
| 5,742,792 | A * | 4/1998 | Yanai et al. | 711/162 |
| 5,796,934 | A * | 8/1998 | Bhanot et al. | 714/4.12 |
| 5,987,432 | A * | 11/1999 | Zusman et al. | 705/35 |
| 6,000,020 | A * | 12/1999 | Chin et al. | 711/162 |
| 6,035,415 | A * | 3/2000 | Fleming | 714/11 |
| 6,101,497 | A * | 8/2000 | Ofek | 707/657 |
| 6,108,300 | A * | 8/2000 | Coile et al. | 370/217 |
| 6,154,847 | A * | 11/2000 | Schofield et al. | 714/4.4 |
| 6,199,055 | B1 * | 3/2001 | Kara et al. | 705/405 |
| 6,202,149 | B1 * | 3/2001 | Hedegard | 713/100 |
| 6,247,141 | B1 * | 6/2001 | Holmberg | 714/2 |
| 6,308,287 | B1 * | 10/2001 | Mitchell et al. | 714/19 |
| 6,317,844 | B1 * | 11/2001 | Kleiman | 714/6.12 |
| 6,438,707 | B1 * | 8/2002 | Ronstrom | 714/13 |
| 6,480,970 | B1 * | 11/2002 | DeKoning et al. | 714/6.12 |
| 6,490,610 | B1 * | 12/2002 | Rizvi et al. | 718/101 |
| 6,493,826 | B1 * | 12/2002 | Schofield et al. | 726/22 |
| 6,523,087 | B2 * | 2/2003 | Busser | 711/114 |
| 6,526,487 | B2 * | 2/2003 | Ohran et al. | 711/162 |
| 6,574,750 | B1 * | 6/2003 | Felber et al. | 714/20 |
| 6,647,410 | B1 * | 11/2003 | Scimone et al. | 709/206 |
| 6,681,339 | B2 * | 1/2004 | McKean et al. | 714/5.11 |
| 6,697,960 | B1 * | 2/2004 | Clark et al. | 714/15 |
| 6,701,455 | B1 * | 3/2004 | Yamamoto et al. | 714/18 |
| 6,823,336 | B1 * | 11/2004 | Srinivasan et al. | 1/1 |
| 6,910,150 | B2 * | 6/2005 | Mashayekhi et al. | 714/4.1 |
| 6,915,447 | B2 * | 7/2005 | Kleiman | 714/6.12 |
| 6,928,580 | B2 * | 8/2005 | Pedone et al. | 714/6.3 |
| 6,959,323 | B1 * | 10/2005 | Tzeng et al. | 709/205 |
| 6,978,347 | B2 * | 12/2005 | Nakamura et al. | 711/114 |
| 7,055,059 | B2 * | 5/2006 | Yanai et al. | 714/6.32 |
| 7,058,850 | B2 * | 6/2006 | Cochran | 714/6.12 |
| 7,058,853 | B1 * | 6/2006 | Kavanappillil et al. | 714/13 |
| 7,069,468 | B1 * | 6/2006 | Olson et al. | 714/4.2 |
| 7,143,307 | B1 * | 11/2006 | Witte et al. | 714/6.23 |
| 7,188,273 | B2 * | 3/2007 | Allen et al. | 714/6.3 |
| 7,222,096 | B2 * | 5/2007 | Anaya et al. | 705/37 |
| 7,293,192 | B2 * | 11/2007 | Allen et al. | 714/6.3 |
| 7,321,906 | B2 * | 1/2008 | Green | 707/613 |
| 7,340,637 | B2 * | 3/2008 | Nagoya | 714/6.3 |
| 7,434,096 | B2 * | 10/2008 | Callaway et al. | 714/6.1 |
| 7,454,372 | B1 * | 11/2008 | Anaya et al. | 705/35 |
| 7,478,275 | B1 * | 1/2009 | Deolasee et al. | 714/13 |
| 7,480,633 | B2 * | 1/2009 | Chow et al. | 705/37 |
| 7,725,764 | B2 | 5/2010 | Morosan et al. | |
| 7,975,174 | B2 | 7/2011 | Morosan et al. | |
| 8,191,078 | B1 * | 5/2012 | Cullen et al. | 719/315 |
| 2001/0037371 | A1 * | 11/2001 | Ohran | 709/214 |
| 2001/0039527 | A1 * | 11/2001 | Ordish et al. | 705/37 |
| 2002/0007470 | A1 * | 1/2002 | Kleiman | 714/6 |
| 2002/0038276 | A1 * | 3/2002 | Buhannic et al. | 705/37 |
| 2002/0103663 | A1 * | 8/2002 | Bankier et al. | 705/1 |
| 2002/0120546 | A1 * | 8/2002 | Zajac | 705/37 |
| 2002/0129294 | A1 * | 9/2002 | Pedone et al. | 714/4 |
| 2002/0133746 | A1 * | 9/2002 | Chen et al. | 714/13 |
| 2002/0174058 | A1 * | 11/2002 | Baghdady | 705/37 |
| 2003/0009707 | A1 * | 1/2003 | Pedone et al. | 714/5 |
| 2003/0055776 | A1 * | 3/2003 | Samuelson | 705/37 |
| 2003/0154305 | A1 * | 8/2003 | Bethmangalkar et al. | 709/245 |
| 2003/0167224 | A1 * | 9/2003 | Periwal | 705/37 |
| 2003/0225672 | A1 * | 12/2003 | Hughes et al. | 705/37 |
| 2003/0225760 | A1 * | 12/2003 | Ruuth et al. | 707/5 |
| 2004/0078625 | A1 * | 4/2004 | Rampuria et al. | 714/4 |
| 2004/0078645 | A1 * | 4/2004 | Yamamoto et al. | 714/6 |
| 2004/0088242 | A1 * | 5/2004 | Ascher et al. | 705/37 |
| 2004/0103342 | A1 * | 5/2004 | Moser et al. | 714/6 |
| 2004/0107157 | A1 * | 6/2004 | Bleunven et al. | 705/37 |
| 2004/0107381 | A1 * | 6/2004 | Bomfim et al. | 714/4 |
| 2004/0148247 | A1 * | 7/2004 | Miller et al. | 705/37 |
| 2004/0199812 | A1 * | 10/2004 | Earl et al. | 714/13 |
| 2004/0267752 | A1 * | 12/2004 | Wong et al. | 707/9 |
| 2004/0268175 | A1 * | 12/2004 | Koch et al. | 714/4 |
| 2005/0138461 | A1 * | 6/2005 | Allen et al. | 714/4 |
| 2005/0152406 | A2 * | 7/2005 | Chauveau | 370/503 |
| 2005/0159927 | A1 * | 7/2005 | Cruz et al. | 702/188 |
| 2005/0182704 | A1 * | 8/2005 | Winbom | 705/37 |
| 2005/0197871 | A1 * | 9/2005 | Mendonca et al. | 705/7 |
| 2005/0229022 | A1 * | 10/2005 | Koishi | 714/4 |
| 2005/0268145 | A1 * | 12/2005 | Hufferd et al. | 714/2 |
| 2005/0271061 | A1 * | 12/2005 | Nguyen et al. | 370/395.52 |
| 2006/0101215 | A1 * | 5/2006 | Yuasa | 711/162 |
| 2006/0101216 | A1 * | 5/2006 | Kobayashi et al. | 711/162 |
| 2006/0174076 | A1 * | 8/2006 | Takeda et al. | 711/162 |
| 2006/0179147 | A1 * | 8/2006 | Tran et al. | 709/227 |
| 2007/0113031 | A1 * | 5/2007 | Brown et al. | 711/160 |
| 2007/0140112 | A1 * | 6/2007 | Osterhout et al. | 370/225 |
| 2007/0233746 | A1 * | 10/2007 | Garbow et al. | 707/200 |
| 2007/0239595 | A1 * | 10/2007 | Setz | 705/37 |
| 2007/0294160 | A1 * | 12/2007 | Brown et al. | 705/37 |
| 2008/0010487 | A1 * | 1/2008 | Dekel et al. | 714/4 |
| 2008/0209258 | A1 * | 8/2008 | Casale et al. | 714/4 |
| 2009/0037320 | A1 * | 2/2009 | Tully et al. | 705/37 |
| 2012/0110372 | A1 * | 5/2012 | Borgendale et al. | 714/4.11 |

OTHER PUBLICATIONS

Japanese Patent Application No. 2012-219878 Office Action dated Jan. 7, 2014 with English Translation.

Parent U.S. Appl. No. 13/114,578, filed May 24, 2011; Title: Failover System and Method; Inventors: Morosan, Tudor et al.

* cited by examiner

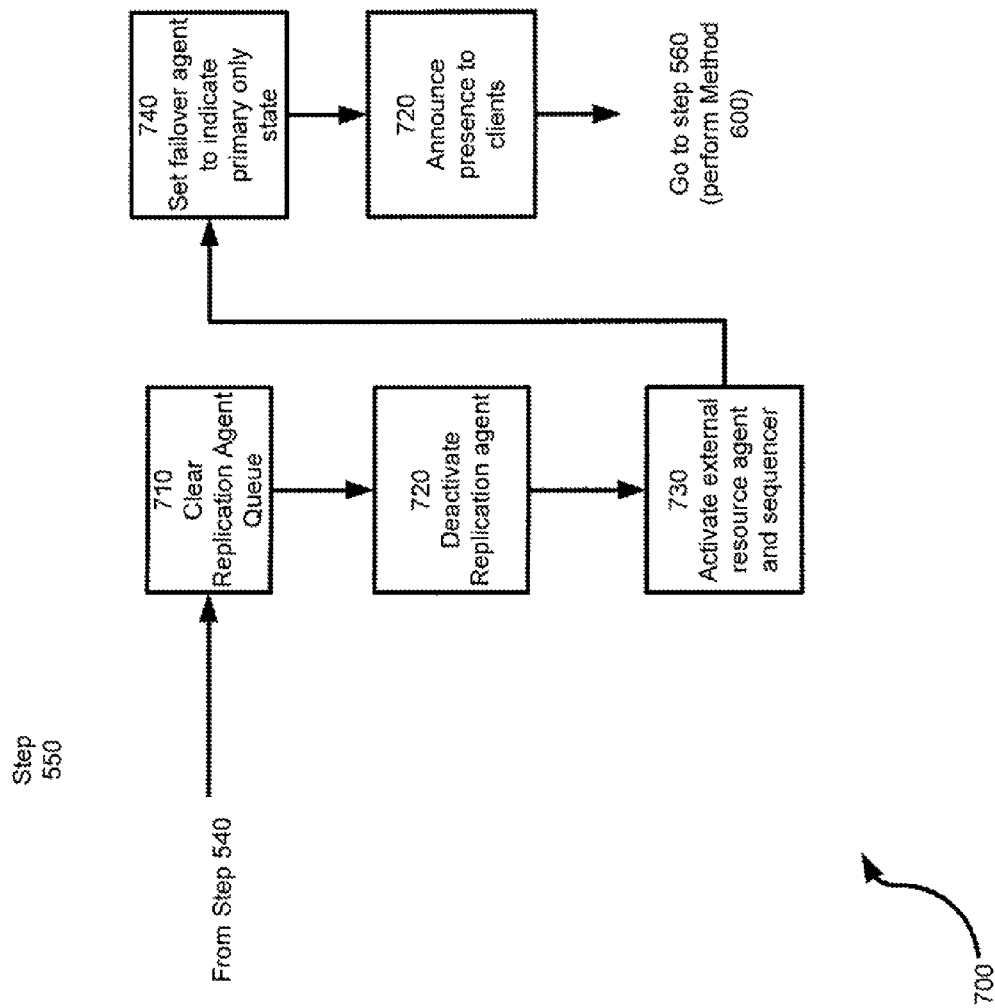

FAILOVER SYSTEM AND METHOD

FIELD OF THE INVENTION

The present invention relates to computer and network architecture and more particularly relates to a failover system and method.

BACKGROUND OF THE INVENTION

Society is increasingly relying on computers and networks to interact and conduct business. To achieve a high level of availability demanded in critical systems, unplanned downtime caused by software and hardware defects should be minimized.

The financial services industry is but one example of an industry that demands highly available systems. Indeed, a large number of data processing activities in today's financial industry are supported by computer systems. Particularly interesting are the so-called "real-time" and "near real-time" On-Line Transaction Processing (OLTP) applications, which typically process large numbers of business transactions over a prolonged period, with high speed and low latency. These applications generally exhibit the following characteristics: (1) complex and high speed data processing, (2) reliable non-volatile data storage, and (3) high level of availability, i.e. the ability to support the services on a substantially uninterrupted basis. When implemented, however, existing applications tend to tradeoff between these performance requirements, since, due to their contradictory effects on the system behavior, no design can completely satisfy all of three characteristics simultaneously, as outlined in greater detail below.

First, complex data processing refers to the ability to perform, in a timely fashion, a large number of computations, database retrievals/updates, etc. This can be implemented through parallel processing, where multiple units of work are executed simultaneously on the same physical machine or on a distributed network. In some systems, the outcome of each transaction depends on the outcomes of previously completed transactions. The parallel aspects of such systems are, inherently, non-deterministic: due to race conditions, operating system scheduling tasks, or variable network delays, the sequence of message and thread execution can not be predicted, nor can they be processed in parallel simply by passing copies of input message to a duplicate system. Non-deterministic systems have non-identical output, so they are not run in parallel on two different computing machines, with the intention of having one substitute for the other in case of failure.

Second, reliable non-volatile data storage refers to the ability to persistently store the processed data, even if a number of the system's software or hardware components experience unexpected failure. This can usually be implemented by using Atomic, Consistent, Isolated, and Durable ("ACID") transactions when accessing or modifying the shared data. ACID transactions can ensure the data integrity and persistence as soon as a unit of work is completed. Every committed ACID transaction is written into the non-volatile computer memory (hard-disk), which helps ensure the data durability, but it is very costly in terms of performance and typically slows down the whole system.

Third, highly available systems attempt to ensure that percentage of availability of a given computer system is as close as possible to 100% of the time. Such availability can be implemented through redundant software and/or hardware, which takes over the functionality in case a component failure is detected. In order to succeed, the failover replicates not only the data, but also the process state. As will be appreciated by those of skill in the art, state replication can be particularly challenging in non-deterministic systems (i.e. systems where computational processing of the same set of events can have more than one result depending on the order in which those events are processed).

Highly available software applications are usually deployed on redundant environments, to reduce and/or eliminate the single point of failure that is commonly associated with the underlying hardware. Two common approaches are known as hot failover and warm failover. Hot failover refers to simultaneously processing the same input in multiple systems, essentially providing complete redundancy in the event of a failure in one of those systems. Warm failover refers to replicating the state of the application (i.e. the data) in backup systems, without processing that data in the backup systems, but having applications capable of processing that data loaded and standing by in the event of failure of a primary system. Cold failover, which is not considered by many to be a form of high availability, refers to simply powering-up a backup system and preparing that backup system to assume processing responsibilities from the primary system.

In hot failover configurations, two instances of the application are simultaneously running on two different hardware facilities, processing copies of the same input. If one of them experiences a critical failure, a supplemental synchronization system can ensure that the other one will continue to support the workload. In the warm failover configurations, one of the systems, designated primary, is running the application; in case of failure, the second system, designated backup, which is waiting in a standby state, will "wake up", take over, and resume the functionality.

Prior art hot failover approaches have at least two disadvantages. First, supplemental software has to run in order to keep the two systems synchronized. In the case of non-deterministic systems, this synchronization effort can lead to an unacceptable (or otherwise undesirable) decrease in performance and complexity where the order of arrival of events must be guaranteed to be identical. Also, prior art concurrent systems used in such applications typically allow multiple threads to execute simultaneously, so they are inherently non-deterministic. Also non-deterministic are the systems with servers and geographically distributed clients, where the variable network delay delivers the messages to the server in an unpredictable sequence.

Warm failover can be used to overcome certain problems with hot failover. Warm failover can be another way to implement failover of non-deterministic systems, by replicating the system data to a redundant, backup system, and then restoring the application functionality to the secondary system. This approach has its drawbacks in the time required to recover the data to a consistent state, then to bring the application to a functional state, and lastly, to return the application to the point in processing where it left off. This process normally takes hours, requires manual intervention, and cannot generally recover the in-flight transactions.

A number of patents attempt to address at least some of the foregoing problems. U.S. Pat. No. 5,305,200 proposes what is essentially a non-repudiation mechanism for communications in a negotiated trading scenario between a buyer/seller and a dealer (market maker). Redundancy is provided to ensure the non-repudiation mechanism works in the event of a failure. It does not address the fail-over of an on-line transactional application in a non-deterministic environment. In simple terms, U.S. Pat. No. 5,305,200 is directed to providing an unequivocal answer to the question: "Was the order sent, or not?" after experiencing a network failure.

U.S. Pat. No. 5,381,545 proposes a technique for backing up stored data (in a database) while updates are still being made to the data. U.S. Pat. No. 5,987,432 addresses a fault-tolerant market data ticker plant system for assembling world-wide financial market data for regional distribution. This is a deterministic environment, and the solution focuses on providing an uninterrupted one-way flow of data to the consumers. U.S. Pat. No. 6,154,847 provides an improved method of rolling back transactions by combining a transaction log on traditional non-volatile storage with a transaction list in volatile storage. U.S. Pat. No. 6,199,055 proposes a method of conducting distributed transactions between a system and a portable processor across an unsecured communications link. U.S. Pat. No. 6,199,055 deals with authentication, ensuring complete transactions with remote devices, and with resetting the remote devices in the event of a failure. In general, the foregoing do not address the fail-over of an on-line transactional application in a non-deterministic environment.

U.S. Pat. No. 6,202,149 proposes a method and apparatus for automatically redistributing tasks to reduce the effect of a computer outage. The apparatus includes at least one redundancy group comprised of one or more computing systems, which in turn are themselves comprised of one or more computing partitions. The partition includes copies of a database schema that are replicated at each computing system partition. The redundancy group monitors the status of the computing systems and the computing system partitions, and assigns a task to the computing systems based on the monitored status of the computing systems. One problem with U.S. Pat. No. 6,202,149 is that it does not teach how to recover workflow when a backup system assumes responsibility for processing transactions, but instead directs itself to the replication of an entire database which can be inefficient and/or slow. Further, such replication can cause important transactional information to be lost in flight, particularly during a failure of the primary system or the network interconnecting the primary and backup system, thereby leading to an inconsistent state between the primary and backup. In general, U.S. Pat. No. 6,202,149 lacks certain features that are desired in the processing of on-line transactions and the like, and in particular lacks features needed to failover non-deterministic systems.

U.S. Pat No. 6,308,287 proposes a method of detecting a failure of a component transaction, backing it out, storing a failure indicator reliably so that it is recoverable after a system failure, and then making this failure indicator available to a further transaction. It does not address the fail-over of a transactional application in a non-deterministic environment. U.S. Pat. No. 6,574,750 proposes a system of distributed, replicated objects, where the objects are non-deterministic. It proposes a method of guaranteeing consistency and limiting roll-back in the event of the failure of a replicated object. A method is described where an object receives an incoming client request and compares the request ID to a log of all requests previously processed by replicas of the object. If a match is found, then the associated response is returned to the client. However, this method in isolation is not sufficient to solve the various problems in the prior art.

Another problem is that the method of U.S. Pat. No. 6,575, 750 assumes a synchronous invocation chain, which is inappropriate for high-performance On-Line Transaction Processing ("OLTP") applications. With a synchronous invocation the client waits for either a reply or a time-out before continuing. The invoked object in turn may become a client of another object, propagating the synchronous call chain. The result can be an extensive synchronous operation, blocking the client processing and requiring long time-outs to be configured in the originating client.

SUMMARY OF THE INVENTION

An aspect of the present invention provides a system for failover comprising at least one client selectively connectable to one of at least two interconnected servers via a network connection. In a normal state, one of the servers is designated a primary server when connected to the client and a remainder of the servers are designated as backup servers when not connected to the client. The at least one client is configured to send messages to the primary server. The servers are configured to process the messages using at least one service that is identical in each of the servers. The services are unaware of whether a server respective to the service is operating as the primary server or the backup server. The servers are further configured to maintain a library or other distinct set(s) of usable code that performs a variety of tasks, including indicating whether a server is the primary server or a server is the backup server. The services within each server are to make external calls to its respective library. The library in the primary server is configured to complete the external calls and return results of the external calls to the service in the primary server and to forward results of the external calls to the service in the backup server. The library in the secondary server does not make external calls but simply forwards the results of the external calls, as received from the primary server, to the service in the secondary server when requested to do so by the service in the secondary server.

The library can be implemented as one or more distinct sets of usable code.

The servers can each be configured to maintain a shared resource where the services can store results of processing the messages. The shared resource can be, and for performance reasons, are preferably, maintained in random access memory of a respective server. However, it is not necessary to maintain the shared resource in random access memory.

The external call can be, (as a non-limiting list of examples) a request for a time stamp, or call to another service provided on the same server, or a call to another service provided physically on a separate machine.

The system can be part of an electronic trading system and the message can thus be an order to buy or sell a security. In this case the external call can be a request for a market feed quote for a value of the security. Where the system is an electronic trading system, the at least one service can include one of an order placement service; an order cancellation service; an order change service; an order matching service; a service to enter a previously-executed trade; or a service to enter a cross trade.

The service in the primary server can be configured to confirm to the client that the message has been processed only if the backup server confirms that the results of the external calls were successfully forwarded to the backup server.

The service in the primary server can be configured to confirm to the client that the message has been processed regardless of whether the backup server confirms that the results of the external calls were successfully forwarded to the backup server. The primary server can deem the backup server to have failed if the backup server does not confirm that the results of the external calls were successfully forwarded to the backup server within a predefined time period.

Another aspect of the invention provides a method for failover in a system comprising:

at least one client selectively connectable to one of at least two interconnected servers via a network connection; one of the servers being designated a primary server when connected to the client and a remainder of the servers being designated a backup server when not connected to the client; the at least one client configured to send messages to the primary server; the method comprising:

configuring the servers to process the messages using at least one service that is identical in each of the servers and is unaware of whether a server respective to the service is operating as the primary server or the backup server;

configuring the servers to maintain a library that indicates whether the server is the primary server or the server is the backup server;

configuring the services to make external calls to its respective the library; and, configuring the library in the primary server to complete the external calls and return results of the external calls to the service in the primary server and to forward results of the external calls to the service in the backup server.

Another aspect of the invention provides a computer readable medium storing a set of programming instructions executable on one of at least two interconnected servers via a network connection that are selectively connectable to at least one client. One of the servers can be designated a primary server when connected to the client in which case a remainder of the servers are designated a backup server when not connected to the client. The at least one client is configured to send messages to the primary server. The programming instructions comprise:

instructions for configuring the servers to process the messages using at least one service that is identical in each of the servers and is unaware of whether a server respective to the service is operating as the primary server or the backup server;

instructions for configuring the servers to maintain a library that indicates whether the server is the primary server or the server is the backup server;

instructions for configuring the services to make external calls to its respective the library; and, instructions for configuring the library in the primary server to complete the external calls and return results of the external calls to the service in the primary server and to forward results of the external calls to the service in the backup server.

BRIEF DESCRIPTION Of THE DRAWINGS

The invention will now be described by way of example only, and with reference to the accompanying drawings, in which.

DETAILED DESCRIPTION OF THE INVENTION

Figure 1:
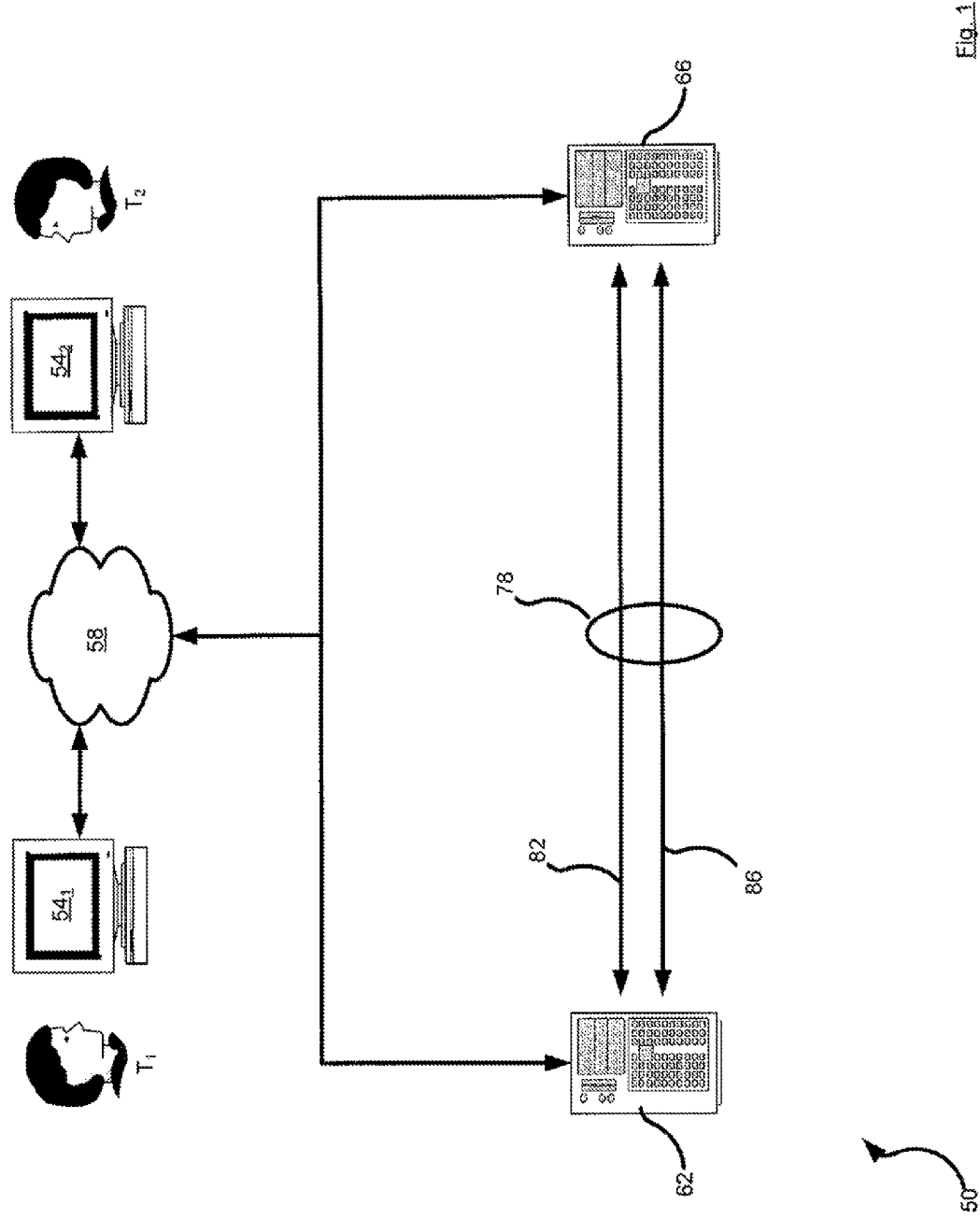
FIG. 1 is a schematic representation of a system for failover in accordance with an embodiment of the invention.

Referring now to FIG. 1, a system for failover is indicated generally at 50. System 50 comprises a plurality of remote clients 54-1 and 54-2 (generically referred to herein as "client 54" and collectively as "clients 54". This nomenclature is used for other elements in the Figures). Clients 54 are connected to a network 58. Network 58 can be any type of computing network, such as the Internet, a local area network, a wide area network or combinations thereof. In turn, network 58 is connected to a first server 62-1 and a second server 62-2. Accordingly, clients 54 can each communicate with server 62-1 and server 62-2 via network 58, as will be discussed in greater detail below.

Clients 54 each belong to individuals and/or entities that will use their respective client 54 to submit requests to server 62-2. For convenience, such individuals or entities are referred to herein as traders T, with trader T-1 using client 54-1, and trader T-2 using client 54-2. Each client 54 is typically a computing device such as a personal computer having a keyboard and mouse (or other input devices), a monitor (or other output device) and a desktop-module connecting the keyboard, mouse and monitor and housing one or more central processing units, volatile memory (i.e. random access memory), non-volatile memory (i.e. hard disk devices) and network interfaces to allow the client 54 to communicate over network 58. However, it is to be understood that client 54 can be any type of computing device, such as a personal digital assistant, cell phone, laptop computer, email paging device etc.

Servers 62 can be any type of computing device operable to receive and process messages from clients 54, such as Sun Fire V480 running a UNIX operating system, from Sun Microsystems, Inc. of Palo Alto Calif., and having four central processing units each operating at about 900 megahertz and having about four gigabytes of random access memory and a non-volatile storage device such as a hard disc drive.

Another type of computing device suitable for servers 62 is a HP ProLiant BL25p server from Hewlett-Packard Company, 800 South Taft, Loveland, Colo. 80537. However, it is to be emphasized that these particular servers are merely exemplary, a vast array of other types of computing environments for servers 62-1 and 62-2 are within the scope of the invention. The type of message being received and processed by server 62-1 is not particularly limited, but in a present embodiment, server 62-1 operates an on-line trading system, and is thus able to process messages that include requests to purchase, sell, cancel etc. securities that can be traded on-line. More particularly, server 62-1 is operable to maintain a central matching engine (not shown), where requests are executed against each other, and against a central repository of orders to thereby process the trading of securities.

Server 62-2 typically has an identical (or at least substantially identical) computing environment as server 62-1. As will be explained further below, the computing environment including its hardware, operating system, applications, etc. is thus chosen to render server 62-2 operable to substitute the functionality of server 62-1 in the event of a failure of server 62-1.

System 50 also includes a replication link 78 that interconnects server 62-1 and server 62-2. In a present embodiment, replication link 78 itself includes a main link 82 and a failsafe link 86 to provide greater robustness in communications between server 62-1 and server 62-2.

Further details about the functions of primary server 62-1, backup server 62-2 and replication link 78, and by extension the various types of hardware that can be used to implement servers 62-1 and 62-2, will become apparent in the discussion below.

Figure 2:
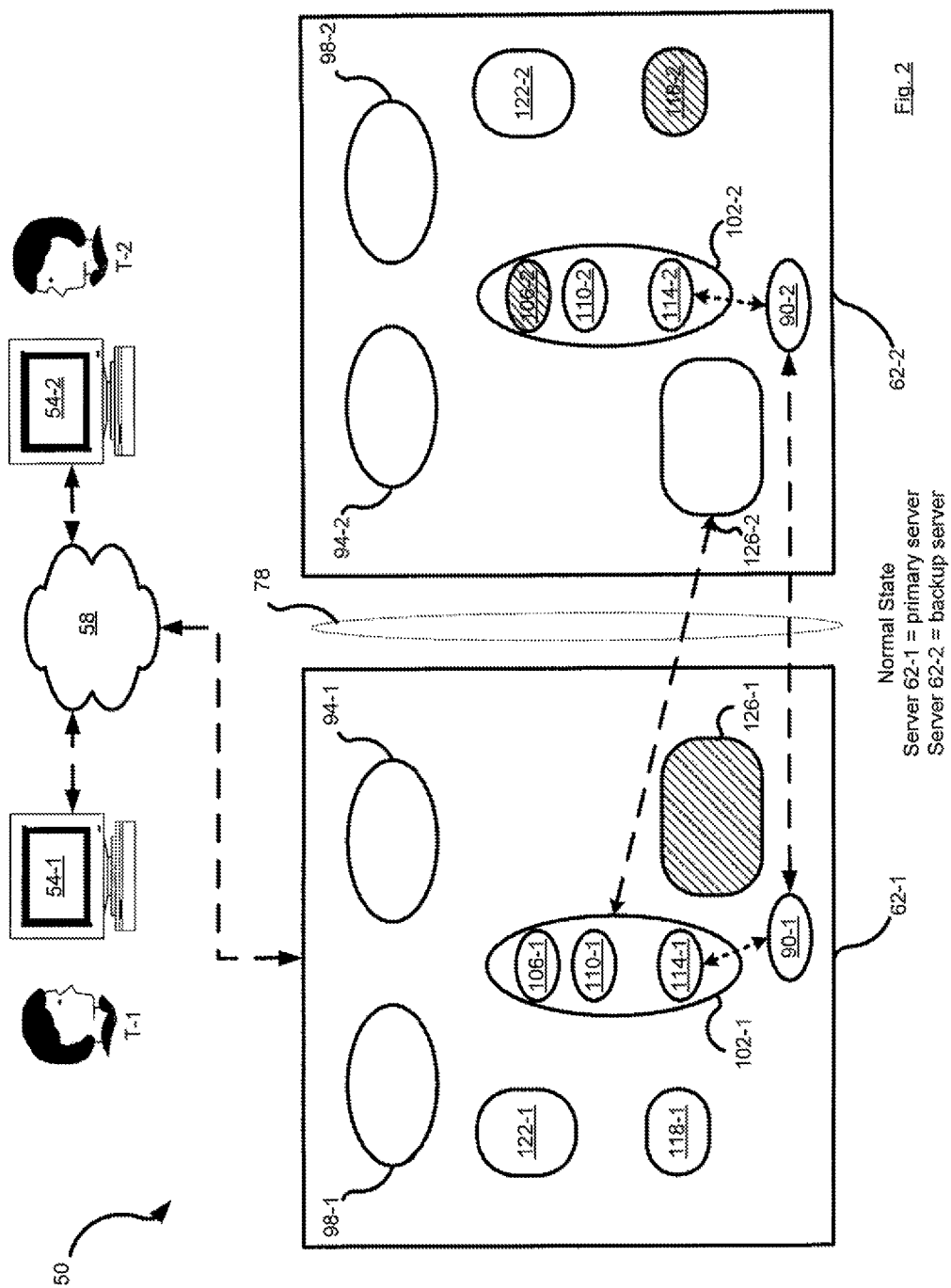
FIG. 2 is a schematic representation of the system in FIG. 1 as operating in a normal state and including exemplary details of various software elements executing on the servers in the system.

In FIG. 2, servers 62-1 and 62-2 are shown in greater detail. Also of note, the various connections in FIG. 2 are shown in dashed lines, to denote virtual connections between various elements in system 50, in contrast to the solid line connections in FIG. 1, which denote the physical connections between various elements of system 50. Thus, such connections as shown in FIG. 2 are intended to denote system 50 operating in a normal state whereby server 62-1 is designated as the primary server and server 62-2 is designated the backup server, with primary server 62-1 servicing requests from clients 54. Further details about the normal state, and other states in which system 50 can operate, will be provided below.

Referring still to FIG. 2, server 62-1 and server 62-2, each include a plurality of software elements that execute on their respective hardware environments to service requests from clients and provide failover functionality.

Server 62-1 and server 62-2 each include a failover agent 90-1 and 90-2 respectively. Failover agents 90 communicate with each other and are operable to periodically test the integrity of link 78 and each other. In a present embodiment, in the normal state, failover agent 90-1 will periodically deliver a keep-alive signal (e.g. "Are you alive?") to failover agent 90-2, to which failover agent 90-2 is expected to periodically respond (e.g. "Yes I am"). Provided such requests are responded to by failover agent 90-2, and provided primary server 62-1 continues to operate normally, then system 50 will remain in the normal state shown in FIG. 2. Thus, failover agent 90-1 is also operable to communicate with other software elements in server 62-1 to indicate that the normal state is in effect.

It should now be apparent that failover agents 90 are operable to make use of both main link 82 and failsafe link 86 that together comprise link 78, as appropriate or as otherwise desired. In this manner, system 50 can remain in the normal state as long as at least one of main link 82 and failsafe link 86 are operational.

Servers 62 each include one or more services that can receive and process various requests from one or more clients 54. The types of services are not particularly limited and can include any type of service, application, or process or the like for which failover protection is desired. In a present, and purely exemplary embodiment, where system 50 is an on-line trading system, servers 62 each include an order placement service 94 and an order cancellation service 98. Order placement service 94, as the name implies, is configured to receive requests from clients 54 for placing of either a sell order or a buy order for a particular security. Order cancellation service 98, as the name implies, is configured to receive requests from clients 54 for cancelling sell or buy orders for a particular security, that were previously-placed using service 94, but before that particular order is actually fulfilled. Other types of services that could be implemented, as will now occur to those skilled in the art of electronic trading, include, without limitation, order matching, change order, enter a trade, or enter a cross. In a present embodiment services 94 and 98 are multi-threaded, though this is not a requirement. (As used herein, multi-threading is not used in a limiting sense, and refers to various forms of concurrent processing where multiple messages are being processed simultaneously, which further contributes to the non-deterministic nature of systems. Multi-threading can be implemented, for example, using multiple processes, or using multiple threads of execution with a single process.)

Servers 62 each also include a library 102 that is accessible to the corresponding services 94 and 98 respective thereto. Each library 102 includes a sequencer 106 and a cache 110. As will be explained in greater detail below, sequencer 106 generates a sequence number in response to a request from a service 94 or 98 respective to library 102. Sequencer 106-2 is inactive in the normal state and such inactivity is represented in FIG. 2 by the hashing through the oval representing sequencer 106-2. (Hashing is used in other elements to denote whether that element is active or inactive in any given particular state.) Cache 110 is a storage area for results of external function calls made by library 102.

Each library 102 also includes a state register 114 that maintains the state in which system 50 is currently operating, and which continuously communicates with its respective failover agent 90 in order to verify the state in which system 50 is currently operating. In FIG. 2, system 50 is operating in the normal state and accordingly state register 114-1 indicates that server 62-1 is currently designated as the primary server while state register 114-2 indicates that server 62-2 is currently designated as the backup server. However, as will be explained in greater detail below, the state of system 50 can change depending on the operational status of various components in system 50.

Servers 62 each also include an external resource agent 118 which is responsible for making external calls to external resources on behalf of services 94 and 98, but which are made via library 102. External resources can include resources that are external to services 94 and 98 but resident on each server 62, such as a time stamp from operating system clock (not shown), and/or resources that are external to each server 62 altogether, such as, in the case of an electronic trading system, a market feed (not shown) that maintains up-to-date information of market prices for various securities which may be the subject of a buy order or a sell order that is placed via order placement service 94. Those skilled in the art will now appreciate that calls by services 94 and 98 to such external resources contribute to the non-deterministic nature of system 50. In the normal state, only external resource agent 118-1 is active, while external resource agent 118-2 is inactive. The inactivity of external resource agent 118-2 is represented in FIG. 2 by the hashing through the oval representing external resource agent 118-2.

Servers 62 each also maintain a shared resource 122 which maintains results of processing steps performed by services 94 and 98 and/or maintains data that may need to be accessible by services 94 and 98. For example, in the electronic trading system of the present embodiment, shared resource 122 maintains and order book, which is simply a set of records of orders placed by service 94. Thus order placement service 94 may, for example, create a record in shared resource 122 of a buy order. Such a buy order may need to be accessed at a later time by order cancellation service 98 in order to cancel that buy order and indicate as such in shared resource 122. Likewise, the buy order may need to be accessed by a matching service (not shown) that also executes on servers 62 in order to match that buy order, according to market rules, with an appropriate corresponding sell order, and update that buy order and that sell order to indicate that a match has been effected and a trade is to be consummated.

Servers 62 each also maintain a replication agent 126. In the normal state, only replication agent 126-2 is active, while replication agent 126-1 is inactive. The inactivity of replication agent 126-1 is represented in FIG. 2 by the hashing through the oval representing replication agent 126-1. As will be explained in greater detail below, an active replication agent 126 communicates with the library 102 in the counterpart server 62 to facilitate the mirroring of information from the primary server to the backup server.

Figure 3:
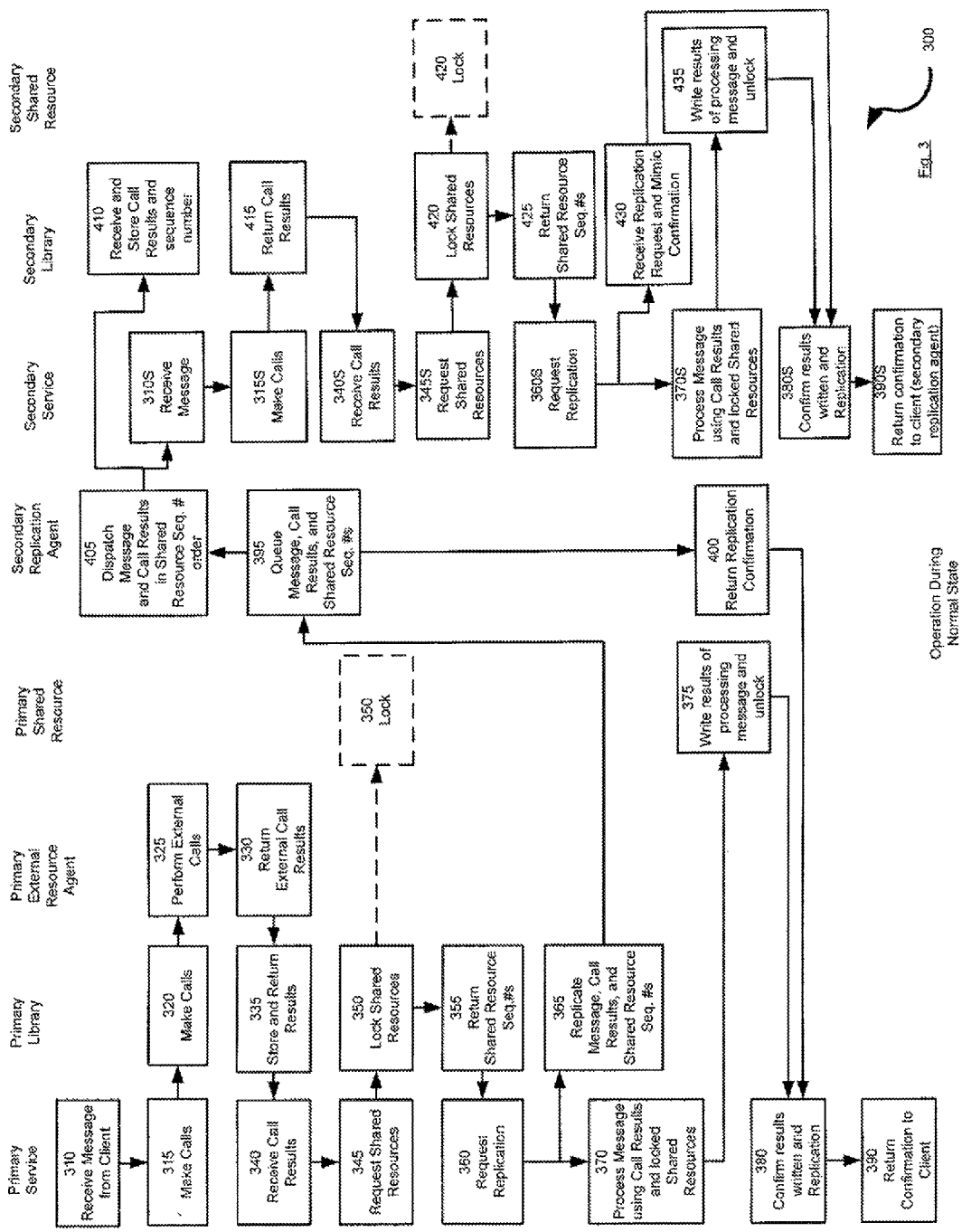
FIG. 3 is a flowchart representing a method of operating a system for failover in the normal state in accordance with another embodiment of the invention.

Referring now to FIG. 3, a method for processing requests during the normal state in accordance with another embodiment of the invention is indicated generally at 300. In order to assist in the explanation of the method, it will be assumed that method 300 is operated using system 50 in the normal state shown in FIG. 2. Furthermore, the following discussion of method 300 will lead to further understanding of system 50 and its various components. For convenience only, however, various process steps of method 300 are indicated in FIG. 3 as occurring within certain components of system 50. Such indications are not to be construed in a limiting sense. It is to be understood, however, that system 50 and/or method 300 can be varied, and need not work as discussed herein in conjunction with each other, and the steps in method 300 need not be performed in the order as shown. Such variations are within the scope of the present invention. Such variations also apply to other methods and system diagrams discussed herein.

Figure 4:
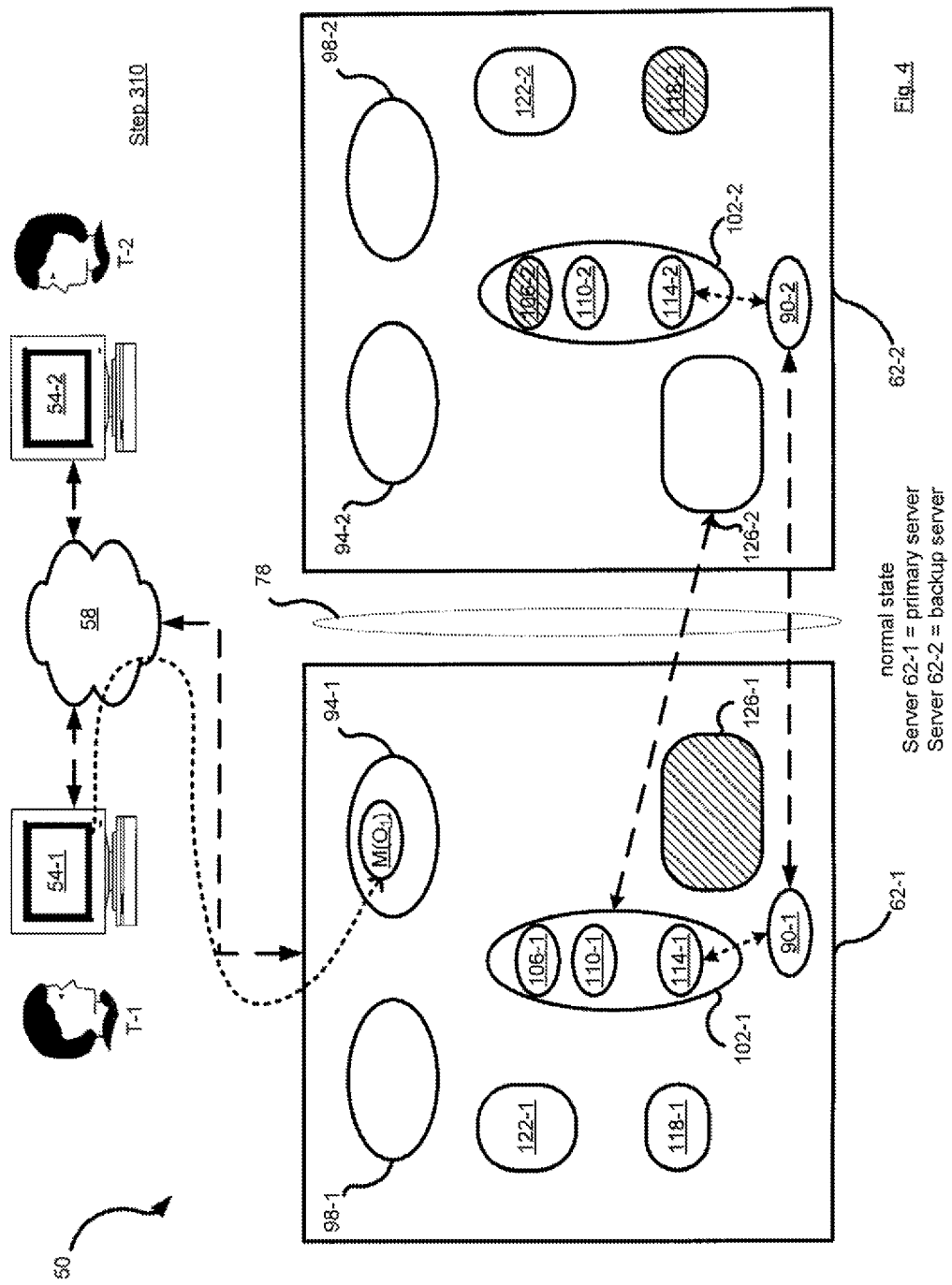
FIG. 4 shows the system of FIG. 2 during performance of the method in FIG. 3.

Beginning first at step 310, a message is received from a client. The type of message is not particularly limited and is generally complementary to an expected type of input for one of the services executing on the servers. When performed on system 50, the message can thus be a buy order or a sell order that is intended as input for order placement service 94, or can be a cancel order that is intended as input for order cancellation service 98. For example, assume that an order to buy is placed into a message from client 54-1 by trader T-1 and the message is sent over network 58 to order placement service 94-1, where, in accordance with step 310, the message is received by order placement service 94-1. This exemplary performance of step 310 is shown in FIG. 4, as a message M(O₁) is shown as originating from client 54-1 and received in server 62-1 at order placement service 94-1. Table I shows an exemplary format of order placement message M(O₁).

TABLE I

Message M(O₁)

| Field Number | Field Name | Example Contents |
|---|---|---|
| 1 | Trader | Trader T-1 |
| 2 | Security Name | ABC Co. |
| 3 | Transaction Type | Buy |
| 4 | Quantity | 1,000 units |

More particularly, Field 1 of Table I, named "Trader" identifies that the originating trader of message M(O₁) is Trader T-1. Field 2 of Table II, named "Security Name" identifies the name of the specific security that is the subject of the trade—in this example, "ABC Co.". Field 3 of Table I, named "Transaction Type" identifies whether the order is to buy, sell, etc. the security identified in Field 2. in this example, the Transaction Type is "Buy", indicating that this is an order to buy. Field 4 of Table I, named "Quantity" identifies the desired quantity of the security—in the present example, the Quantity is "1,000 units", indicating that the intention is to Buy 1,000 units of ABC Co. Those skilled in the art will now recognize that the order in Table I is a market order, in that the price of the order will be based on whatever the current market price is for the Security in Field 2.

Having received the message at step 310, method 300 advances to step 315 at which point the relevant service will make any calls for external data utilized to further process the message. Continuing with the example, at step 315 order placement service 94-1 will make such external calls to primary library 102.1. In this example it will be assumed that such calls are for:

i) a time-stamp to assign to the order in message M(O₁) identifying the time at which the order was received and, ii) a current market price for the security identified in the order in message M(O₁).

Figure 5:
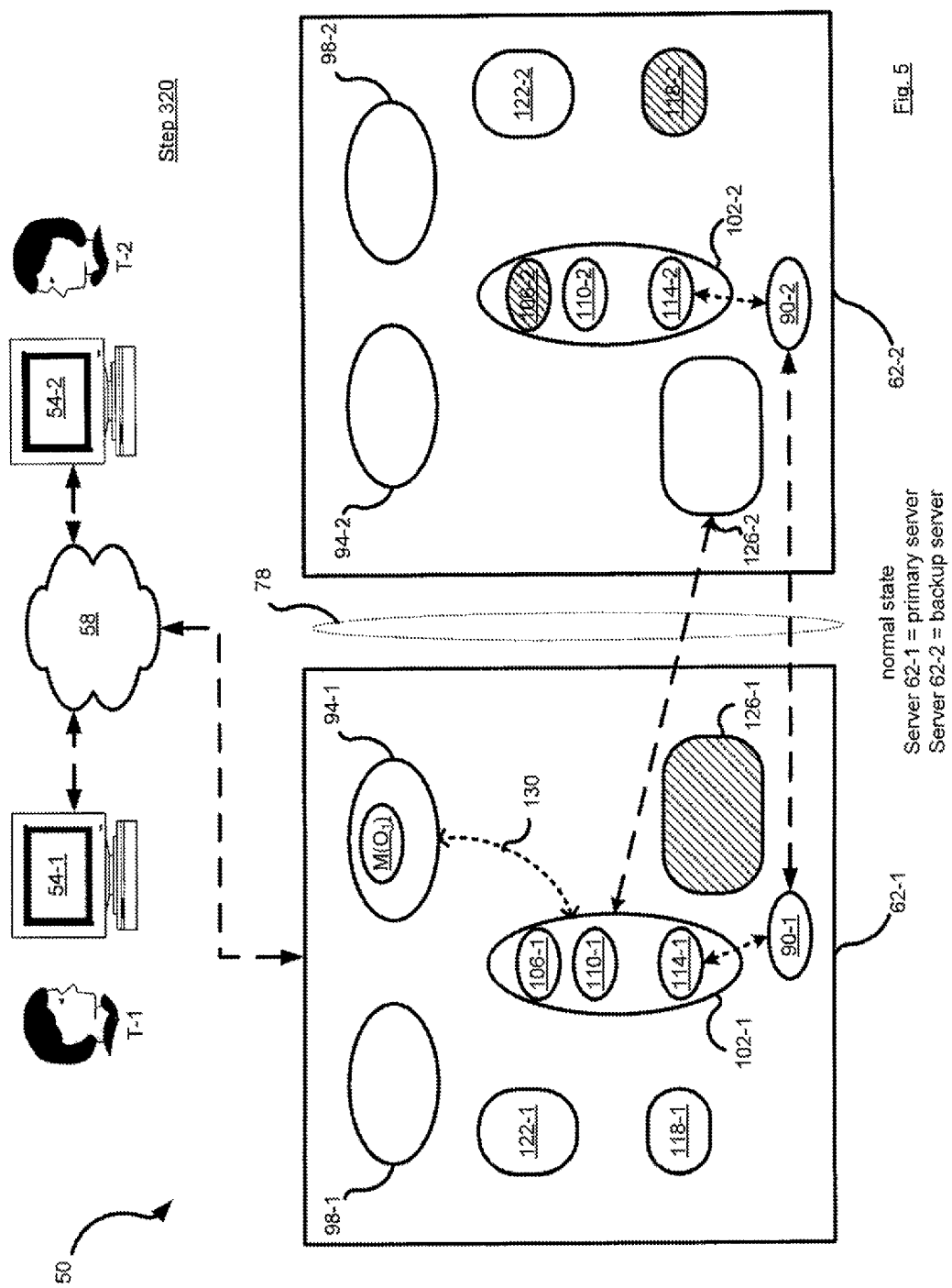
FIG. 5 shows the system of FIG. 2 during performance of the method in FIG. 3.

Performance of step 315 is represented in FIG. 5 as a dotted line representing a call from order placement service 94-1 to primary library 102-1 is indicated at 130.

Next, at step 320, primary library 102-1 will make the calls. Primary library 102-1 will consult with failover agent 114-1 and confirm that server 62-1 is designated the primary server and that system 50 is in the normal state. After so confirming, primary library 102-1 will respond to calls made by service 94-1 by:

i) making an external call to external resource agent 118-1 in order to obtain a time-stamp;

ii) making a further external call to external resource agent 118-1 in order to obtain the current market price.

Thus, at step 325, external resource agent 118-1 will make external calls to the operating system clock (not shown) and the market feed (not shown) to obtain a time-stamp and the current market price, respectively.

Figure 6:
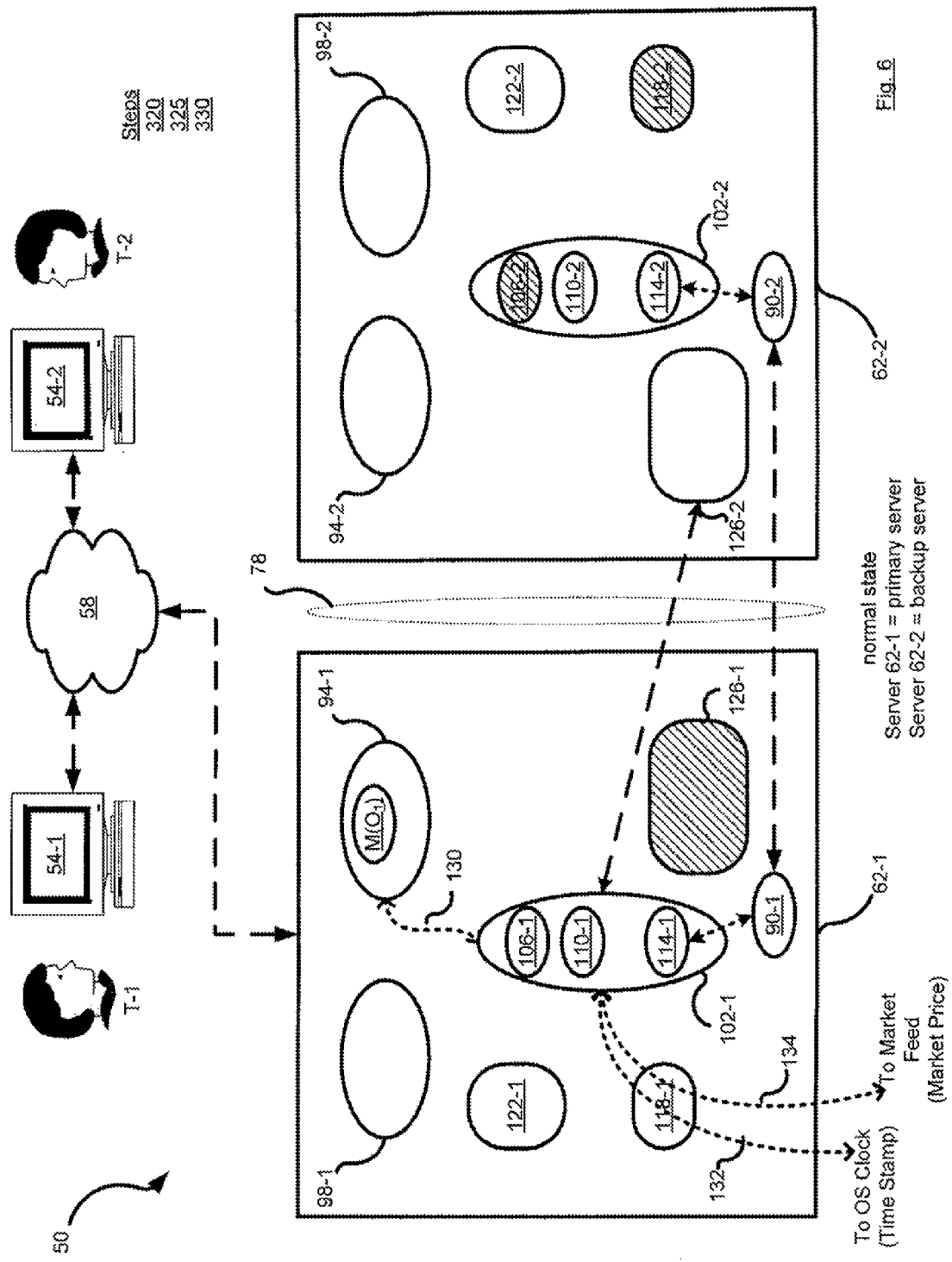
FIG. 6 shows the system of FIG. 2 during performance of the method in FIG. 3.

Performance of steps 320 and 325 are represented in FIG. 6 as dotted lines representing calls for a time stamp via external resource agent 118-1 and a market price via external resource agent 118-1 are indicated at 132 and 134, respectively.

Those skilled in the art will now recognize that external calls 132 and 134, in particular, render system 50 non-deterministic in nature and therefore present unique challenges in providing a failover system that, in the event of failover, addresses the non-deterministic nature of the system during the recovery such that the recovery is transparent to traders T. (By way of further explanation, assume that system 50 was altered so that both servers 62 made external calls for each message. Yet, for any given message M, the exact moment when a call is made for a time stamp is critical in order to ensure market fairness, and it is highly unlikely that both servers 62 would make a call for a time stamp for the same message at the same time, and therefore each server 62 could assign a different time priority for the same message M, resulting in differing outcomes of the same machine process. Likewise, for any given message M the exact moment when a call is made for a market price is also critical in order to ensure market fairness, and it is highly unlikely that both servers 62 would make a call for a market price for the same message at the same time, and therefore each server 62 could have a different market price for the same message M. During a failover, each server 62 would not have consistent business data and the failover would be meaningless.) From reading further, those skilled in the art will come to recognize how such challenges are addressed, as well as recognizing other aspects of the invention.

At step 330, the results of external calls 132 and 134 are returned to primary library 102-1. At step 335, the results of all calls 132 and 134 are stored in cache 110-1 and returned to service 94-1.

Continuing with the example, it will be assumed that the result of call 132 is the time-stamp 12:00 PM, Jan. 5, 2000; and it will be assumed that the result of call 134 is the market price of $2.00. The storage of these results in cache 110-1 is represented in Table II and in FIG. 7.

TABLE II

Exemplary Contents of Cache 110-1 after Step 335

| Record Number | Field Number | Field Name | Example Contents |
|---|---|---|---|
| 1 | 1 | Message | M(O$_1$) |
| 1 | 2 | Time Stamp | 12:00 PM, Jan. 5, 2000 |
| 1 | 3 | Market Price | $2.00 |

Figure 7:
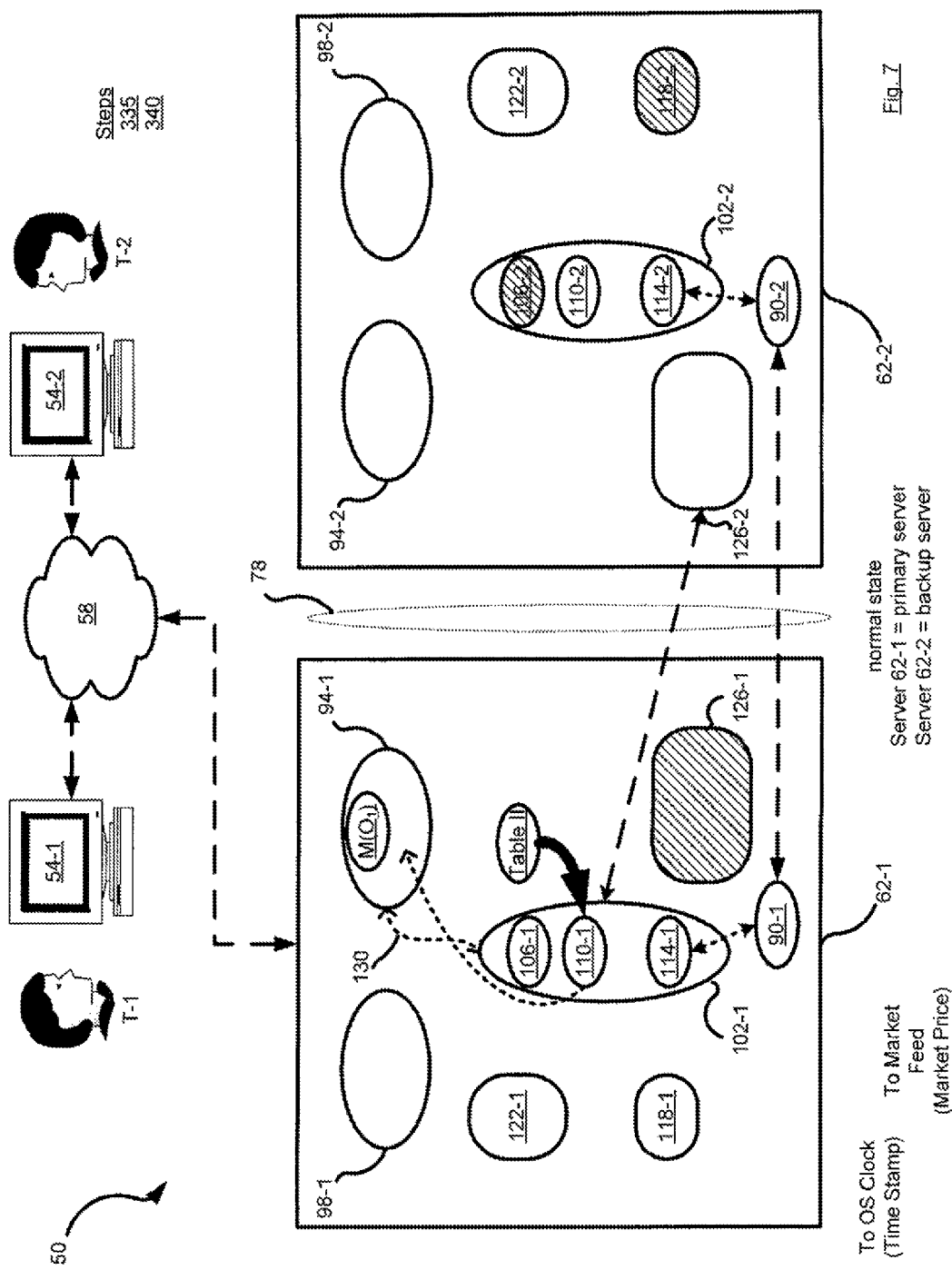
FIG. 7 shows the system of FIG. 2 during performance of the method in FIG. 3.

At step 340, the call results are received by the service. Continuing with the present example, the call results stored in Table II will be returned to service 94-1, which is also represented in FIG. 7.

Figure 8:
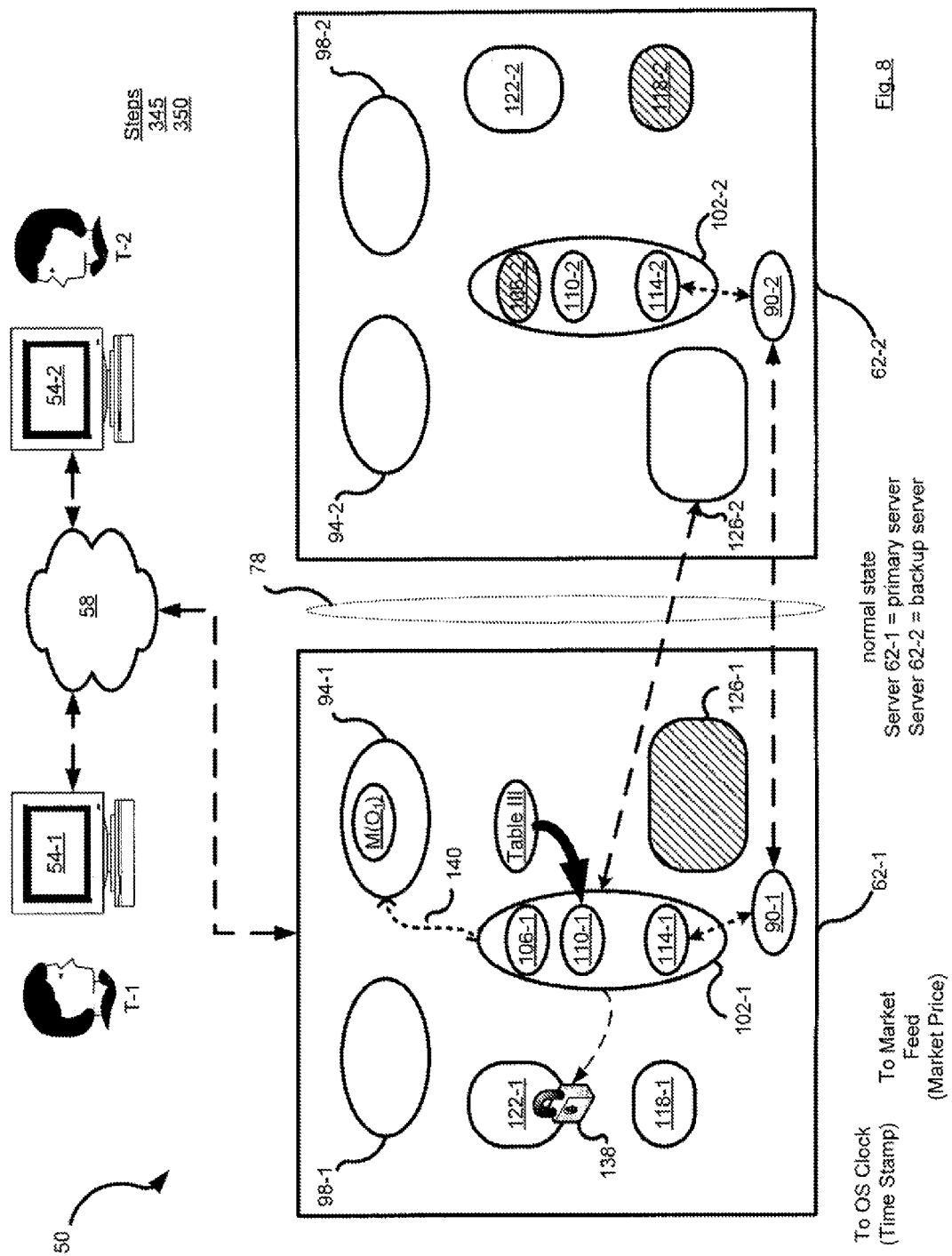
FIG. 8 shows the system of FIG. 2 during performance of the method in FIG. 3.

Next, at step 345, the service will make a request for shared resources. In the present example the request is made by service 94-1 to library 102-1. In turn, at step 350, library 102-1 will issue an instruction to shared resource 122-1 to "lock" it and thereby prevent any other service, (e.g. service 98-1, or another thread within service 94-1), from accessing shared resource 122-1. (As will be described in greater detail below, if shared resources 122-1 is already locked, then method 300 will pause at step 345 until shared resources 122-1 becomes unlocked). Performance of steps 345 and 350 are represented in FIG. 8 as a dotted line representing a request for shared resources indicated at 140. The locking of shared resources 122-1 is represented by a padlock 138.

Next, at step 355, a shared resource sequence number is returned. This step can be performed by library 102-1 utilizing sequencer 106-1 to generate a sequence number associated with message M(O$_1$). Continuing with the example, it will be assumed that a sequence number of "one" is generated. The storage of these results in cache 110-1 is represented in Table III and FIG. 8. Note that Table III is an update of Table II.

TABLE III

Exemplary Contents of Cache 110-1 after Step 355

| Record Number | Field Number | Field Name | Example Contents |
|---|---|---|---|
| 1 | 1 | Message | M(O$_1$) |
| 1 | 2 | Time Stamp | 12:00 PM, Jan. 5, 2000 |
| 1 | 3 | Market Price | $2.00 |
| 1 | 4 | Sequence Number | 1 |

Next, at step 360, replication is requested. Step 360 in the present example is performed by service 94-1, which sends an instruction to library 102-1 to perform replication. At step 365, replication of the message, call results and sequence number is initiated. In the present example, the contents of Table III is replicated by library 102-1. Step 365 will be discussed further later below.

At step 370, the message is processed using the call results and the locked shared resources. In the present example step 370 is performed by service 94-1, which uses the contents of Table III and performs processing steps associated with service 94-1 in order to generate results from Table III. Since service 94-1 is an order placement service, and message M(O$_1$) represents a buy order, then at step 370 service 94-1 will generate a buy order that will be recorded in shared resource 122-1 for subsequent matching with a sell order against a sell order from, for example, trader T-2, or other trade processing such as cancellation of the order using service 98-1.

For purposes of the present example, it will be assumed that there are no orders in shared resources 122-1 against which message M(O$_1$) can be matched, and thus the results of step 370 will be to simply generate a complete record of the details of the buy order associated with message M(O$_1$). Table IV shows exemplary results of the performance of step 370.

TABLE IV

Exemplary Results of performance of step 370

| Record Number | Field Number | Field Name | Example Contents |
|---|---|---|---|
| 1 | 1 | Time Stamp | 12:00 PM, Jan. 5, 2000 |
| 1 | 2 | Market Price | $2.00 |
| 1 | 3 | Sequence Number | 1 |
| 1 | 4 | Trader | Trader T-1 |
| 1 | 5 | Security Name | ABC Co. |
| 1 | 6 | Transaction Type | Buy |

Figure 9:
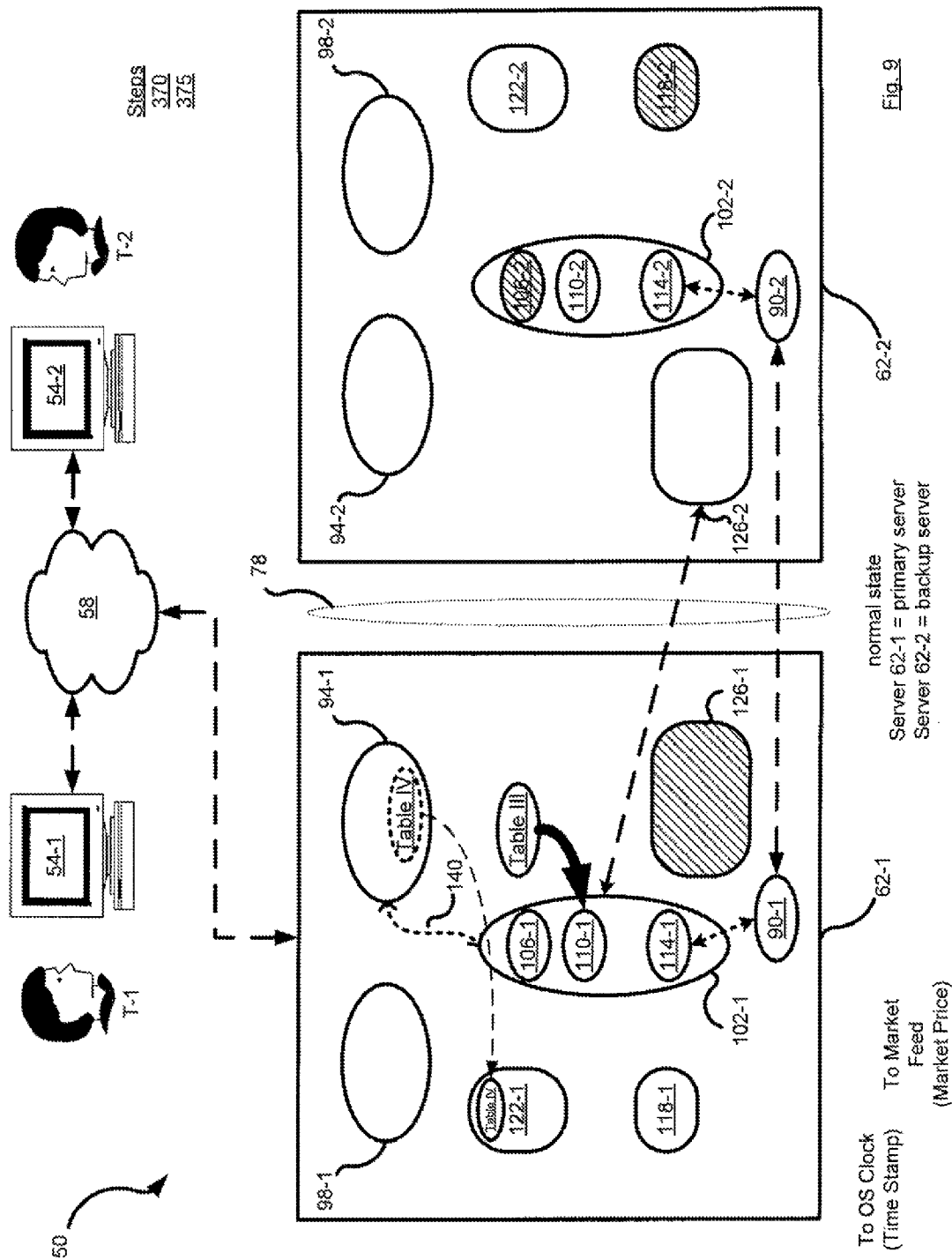
FIG. 9 shows the system of FIG. 2 during performance of the method in FIG. 3.

Next, at step 375, the results of the performance of step 370 are written to the shared resources, and then the shared resources are unlocked. The generation of Table IV by service 94-1 at step 370, and the storage of those results in shared resources 122-1 at step 375 is represented in FIG. 9.

Next, at step 380, the service confirms that the results have been written at step 375, and a confirmation that replication has been performed at step 400. In the current example, at step 380, service 94-1 will wait for a confirmation from shared resources 122-1 that the Table IV was written to shared resources 122-1. Likewise, at step 380, service 94-1 will wait for confirmation, from step 400, that the replication initiated at step 365 has been completed. Steps 365 and 400 will be explained in greater detail below.

In an alternative embodiment, step 380 need not actually wait for the confirmation from step 400 before proceeding on to step 390. However step 380 would still expect to eventually receive such confirmation from step 400, and, if such confirmation was not forthcoming, then step 380 would assume that server 62-2 had failed, in which event server 62-1 would begin performing method 600 as explained later below. Those skilled in the art will now recognize that this is an asynchronous mode of operation and may be preferred in certain circumstances where speed is preferred over confirmation of the status of server 62-2.)

Next, at step 390, confirmation is returned to client. In the current example, at step 390 service 94-1 will send a confirmation message to client 54-1 that message M(O₁) has been processed as requested by trader T-1.

It is to be reiterated that step 390 of method 300 (i.e. operation during the normal state) is not completed until step 380, which in turn is not completed until the replication initiated at step 365 has been completed. Returning now to step 365, the message, call results and shared resource sequence numbers are replicated. In the present example step 365 is performed by library 102-1 responsive to the request from service 94-1 at step 360. Thus, library 102-1 will bundle the contents of Table III and deliver it to replication agent 126-2.

Figure 10:
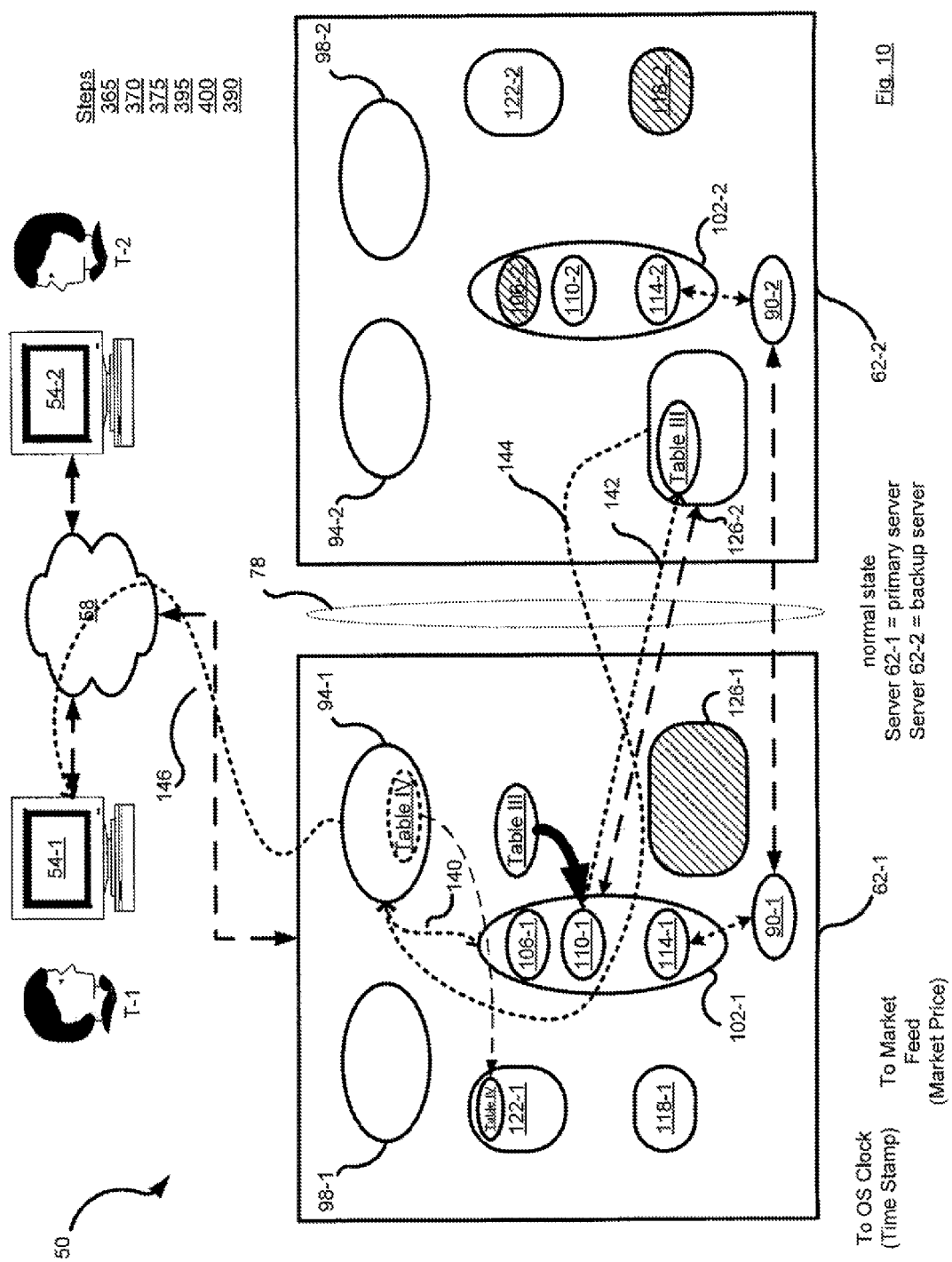
FIG. 10 shows the system of FIG. 2 during performance of the method in FIG. 3.

The performance of Steps 365, 370, 375, 395, 400 and 390 are represented in FIG. 10. (FIG. 10 builds on the representation of performance of steps 370 and 375 in FIG. 9). Step 365, the delivery of Table III from cache 110-1 of library 102-1 to replication agent 126-2 is represented by the line indicated at 142. Steps 370 and 375 are represented in FIG. 10 as earlier discussed in relation to FIG. 9. Step 395, the queuing of the message, call results, and shared resource sequence number is represented by the oval marked as Table III appearing inside replication agent 126-2. Step 400, the returning of confirmation of replication from replication agent 126-2 to service 94-1 (Carried via library 102-1), is represented by the line indicated at 144. Step 390, the returning of confirmation from service 94-1 to client 54-1, is represented by the dotted line indicated at 146.

The foregoing substantially completes the description of the processing of one message by primary server 62-1 during operation in the normal state. It should now be understood that primary server 62-1 can process multiple messages, either in series and/or substantially in parallel according to the above description of steps 310 through 400. For example, while service 94-1 is handling one message M, likewise service 98-1 can also be processing another message M substantially as described above, with library 102-1 interacting with both services 94-1, 98-1. Additionally, while one thread of service 94-1 is handling one message M, another thread of service 94-1 can also be processing another message M substantially as described above, with library 102-1 interacting with both threads of the service. Step 350 ensures that shared resource 122-1 are locked to avoid contention between services 94-1 and 98-1 (or threads thereof), to ensure that only one of those services can interact with shared resource 122-1 at a time. (Note that "interact" can include any type of function, including without limitation reading, writing, and deleting). As an example of contention that needs to be avoided, order cancellation service 98-1 would read from and write to shared resource 122-1 while it is locked in order to cancel a given order, which would prevent a matching service (not shown) from matching with an order that is being cancelled.

By the same token, step 355 utilizes sequencer 106-1 to generate unique sequence numbers for each message M, and regardless of which service 94-1 or 98-1 (or thread thereof) is handling the message M. Thus, there may be times when a particular service 94-1 or 98-1 (or thread thereof) makes a request for shared resources 122-1 at step 345 while shared resources 122-1 is locked, and therefore that particular service (or thread thereof) will pause at step 345 until shared resources 122-1 is unlocked before continuing onwards from step 345.

Having described the processing of messages by primary server 62-1 during operation in the normal state, discussion of method 300 will now turn to performance of steps 405 and onwards and the processing of messages by secondary server 62-2.

Referring again to FIG. 3, at step 405, messages, call results and sequence numbers are dispatched according to the shared resource sequence number. Continuing with the example above, at this point message M(O₁) (i.e. the contents of Field 1 of Record 1 from Table III) will be dispatched to service 94-2, while the call results (i.e. the contents of Fields 2 and 3 of Record 1 from Table III) and sequence number (i.e. the contents of Field 4 of Record 1 from Table III) will be dispatched to secondary library 102-2.

Thus, at step 310S service 94-2 will receive message M(O₁) from replication agent 126-2 in much the same way that, at step 310, service 94-1 received message M(O₁) from client 54-1. From the perspective of service 94-2, message M(O₁) has been received from a client. At this point it will now become apparent that service 94-2 is substantially identical in all ways to service 94-1. (Likewise service 98-2 is substantially identical to service 98-1). Service 94-2 will operate in server 62-2 in substantially the same manner that service 94-1 operates in server 62-1. In other words, steps 310S, 315S, 340S, 345S, 360S, 370S, 380S and 390S are performed by service 94-2 in the same manner as steps 310, 315, 340, 345, 360, 370, 380 and 390 are performed by service 94-1 in server 62-1. Neither service 94-1, nor service 94-2 are aware of whether the particular server they are operating within are designated as primary server or backup server. This presents one of the many advantages of the present invention, as services can be developed once for two (or more) servers, without having to develop one set of services for a server designated as a primary server and one set of services for a server designated as a backup server.

However each library 102, in consultation with its respective failover agent 90 and state register 114, is aware of whether its respective server 62 is designated as a primary server or as a backup server. Thus, when service 94-2 performs step 315S and makes calls, library 102-2 will not utilize external resource agent 118-2 but, at step 415, will simply return the call results (i.e. the contents of Fields 2 and 3 of Record 1 from Table III) that were received by library 102-2 at step 410.

Figure 11:
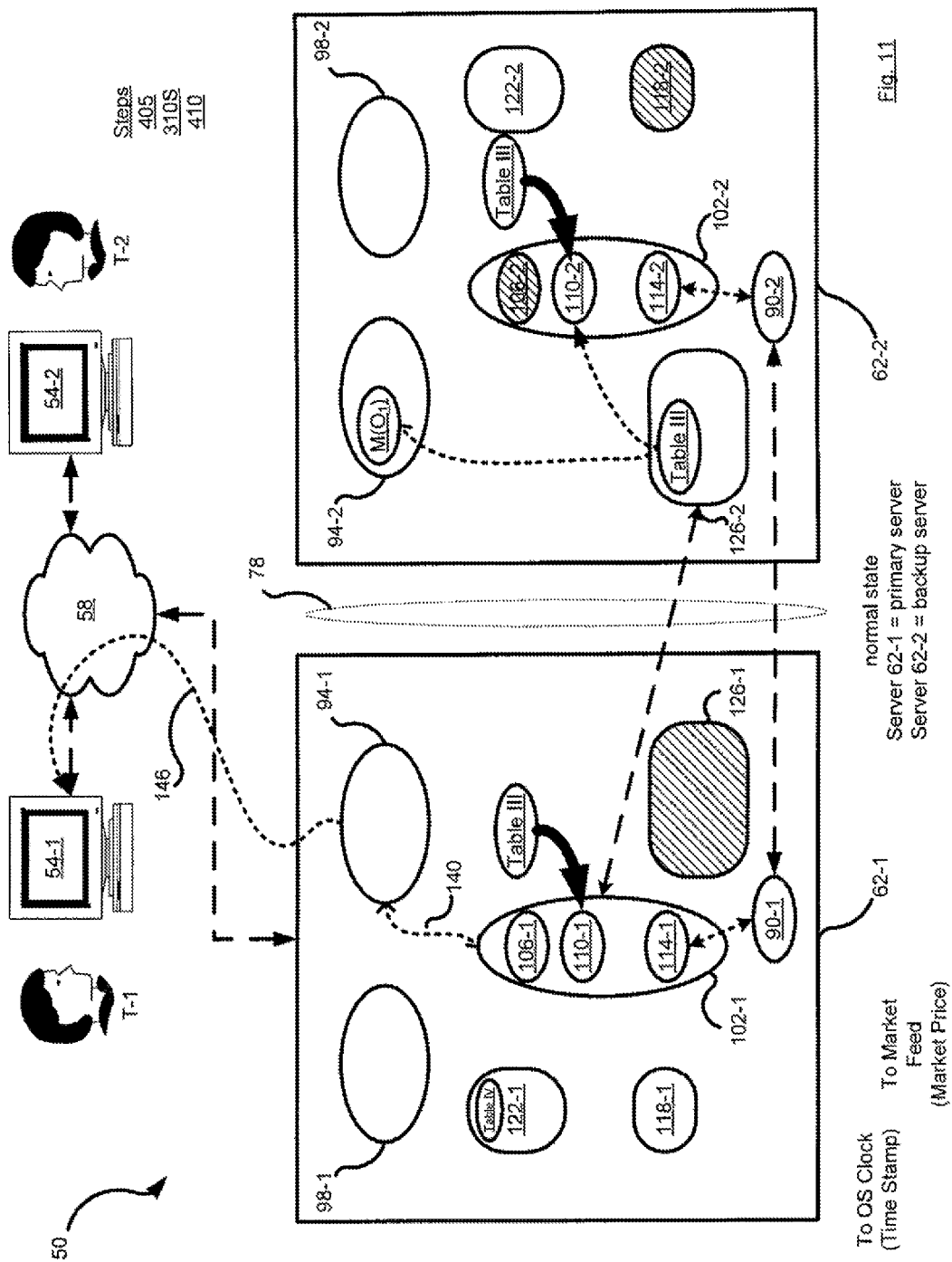
FIG. 11 shows the system of FIG. 2 during performance of the method in FIG. 3.
Figure 12:
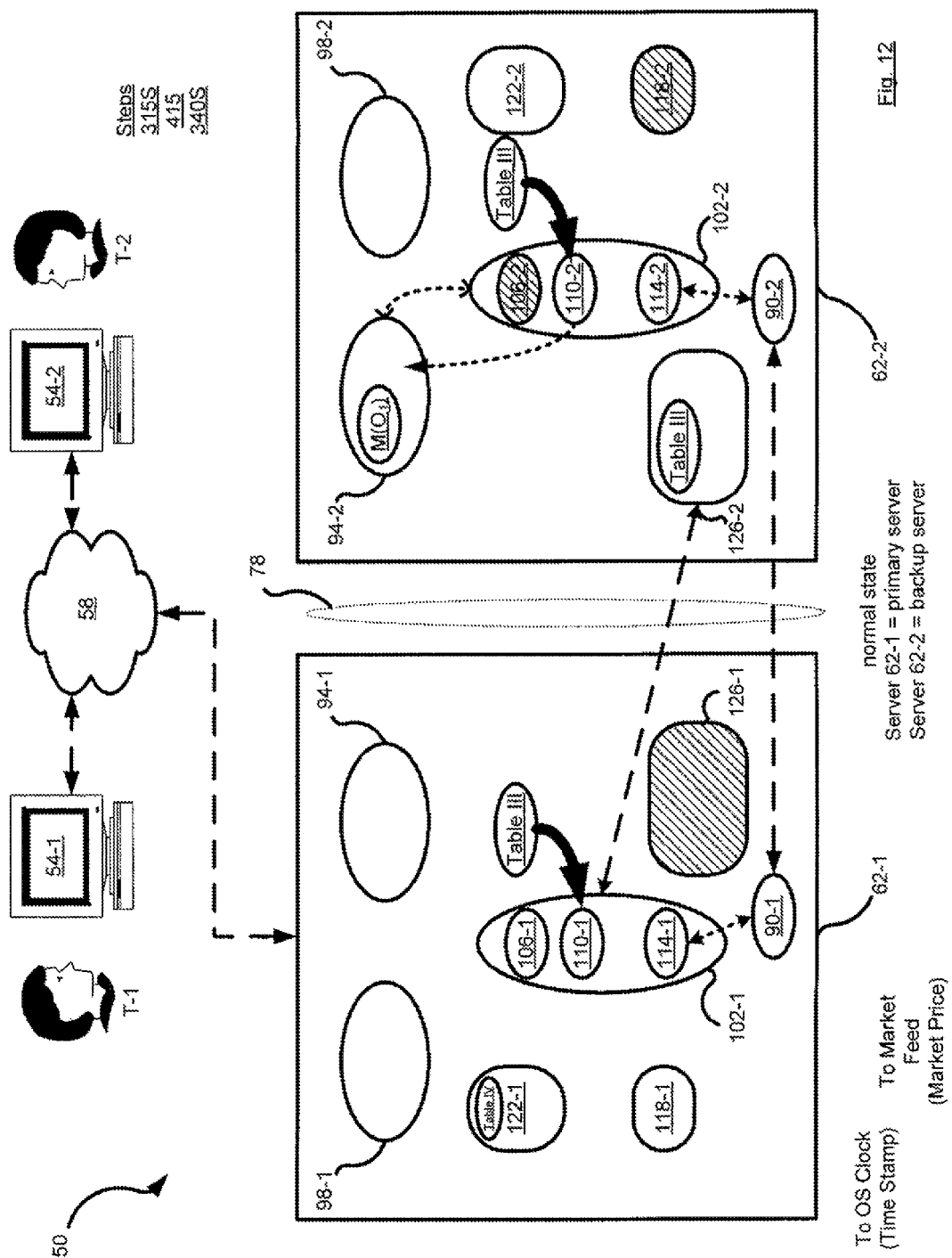
FIG. 12 shows the system of FIG. 2 during performance of the method in FIG. 3.

The performance of steps 405, 310S, 410 are represented in FIG. 11. The performance of steps 315S, 415 and 340S are represented in FIG. 12.

By the same token, when service 94-2 performs step 345S and requests shared resources, library 102-2 will respond at step 420 by locking shared resources 122-2, and at step 425 by returning the shared resource sequence number (i.e. the contents of Field 4 of Record 1 from Table III) that were received by library 102-2 at step 410 and without utilizing sequencer 106-2.

Figure 13:
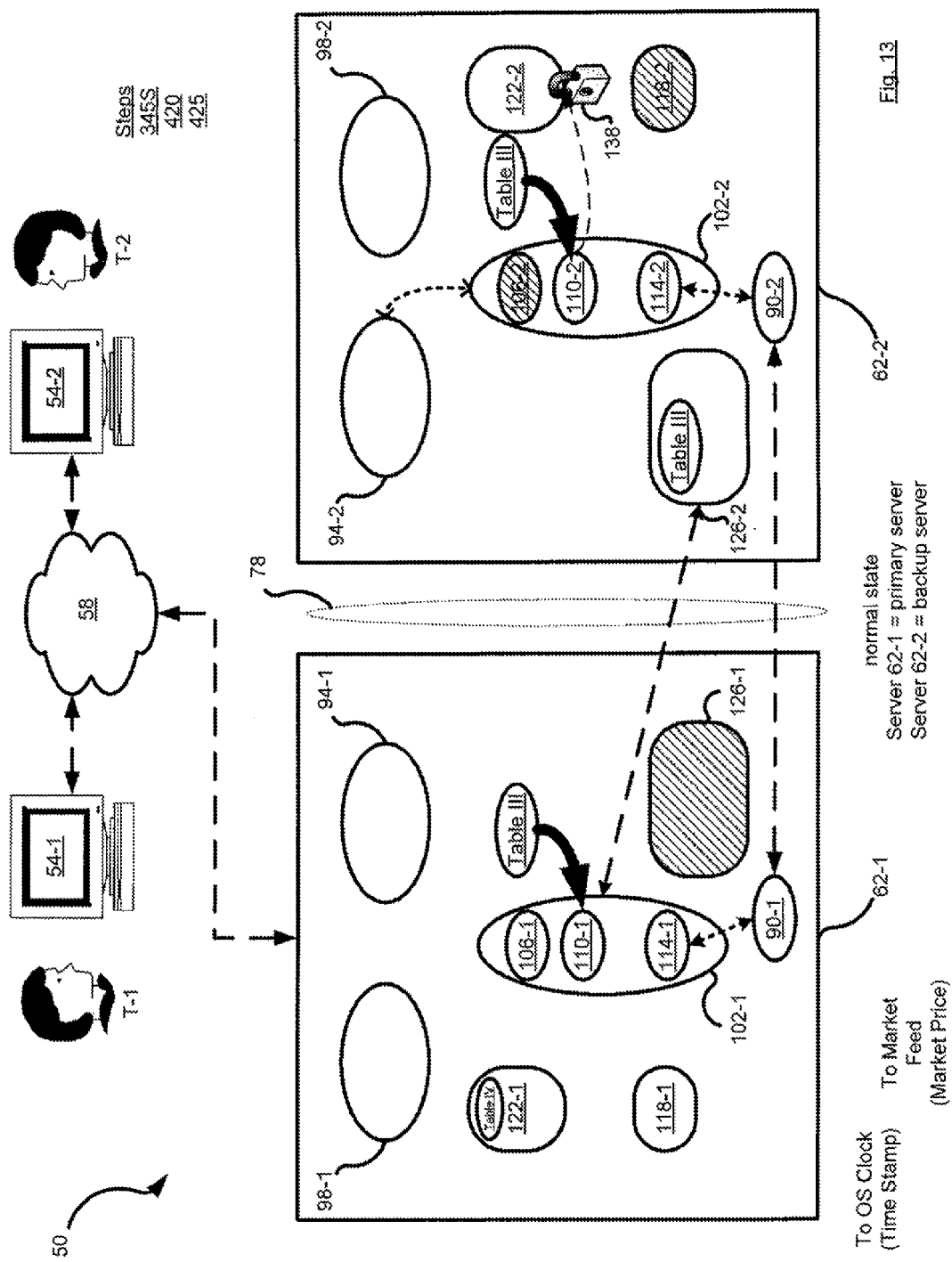
FIG. 13 shows the system of FIG. 2 during performance of the method in FIG. 3.

The performance of steps 345S, 420, 425 are represented in FIG. 13.

By the same token, when service 94-2 performs step 360S and requests replication, library 102-2 will respond at step 430 not by actually performing replication, but by returning a replication confirmation to service 94-2 at step 380S, essentially mimicking step 400. Steps 370S and 435 are thus performed substantially identically to steps 370 and 375, respectively, such that the contents of Table IV are generated independently by service 94-2 and stored within shared resource 122-2.

Figure 14:
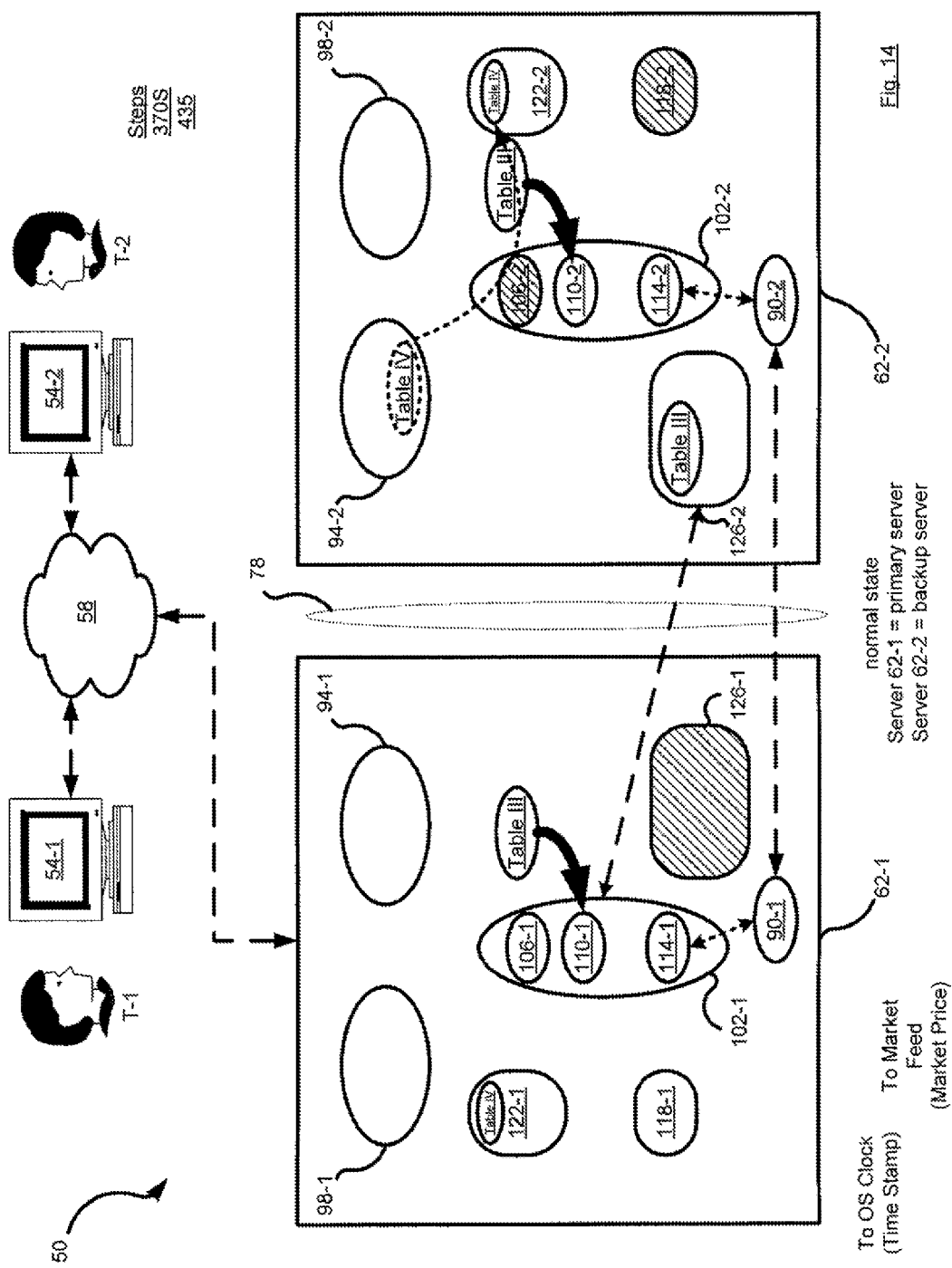
FIG. 14 shows the system of FIG. 2 during performance of the method in FIG. 3.

The performance of steps 370S and 435 are represented in FIG. 14.

Similarly, steps 380S and 390S are performed in the same manner as step 380 and steps 390, except that the confirmation returned at step 390S is returned to replication agent 126-2 Instead of to client 54-1.

At this point, at the conclusion of this performance of method 300, it will now be recognized that the results of processing message $M(O_1)$ are now stored in both shared resource 122-1 and shared resource 122-2 as Table IV. It can also be noted that the actual latency between the performance of steps 310S, 315S, 340S, 345S, 360S, 370S, 380S, 390S and steps 310, 315, 340, 345, 360, 370, 380, 390 is actually quite minimal. Any such latency can be determined by the network latency at step 365 and the processing of steps 395 and 405, which can be very fast. In any event, system 50 can be configured so that the latency is ultimately much faster than writing backup information to a hard disk, which is yet another advantage of the present invention.

Thus, method 300 can be used to process messages to place orders to buy and sell securities using service 94-1 (and as shadowed by service 94-2). Likewise method 300 can be used to cancel those orders using service 98-1 (and as shadowed by 98-2). Additional services can be created and included in server 62-1 and can be readily placed onto server 62-2 to provide a robust failover for those services, but without requiring one set of code for the service on server 62-1 while requiring another set of code for the service on server 62-2—one set of code for a particular service is all that is needed for both servers. Perhaps more significantly, from certain perspectives, is that system 50 can substantially guarantee the results in the event of a failover, without the loss of speed that normally accompanies writing to a hard disk.

Figure 15:
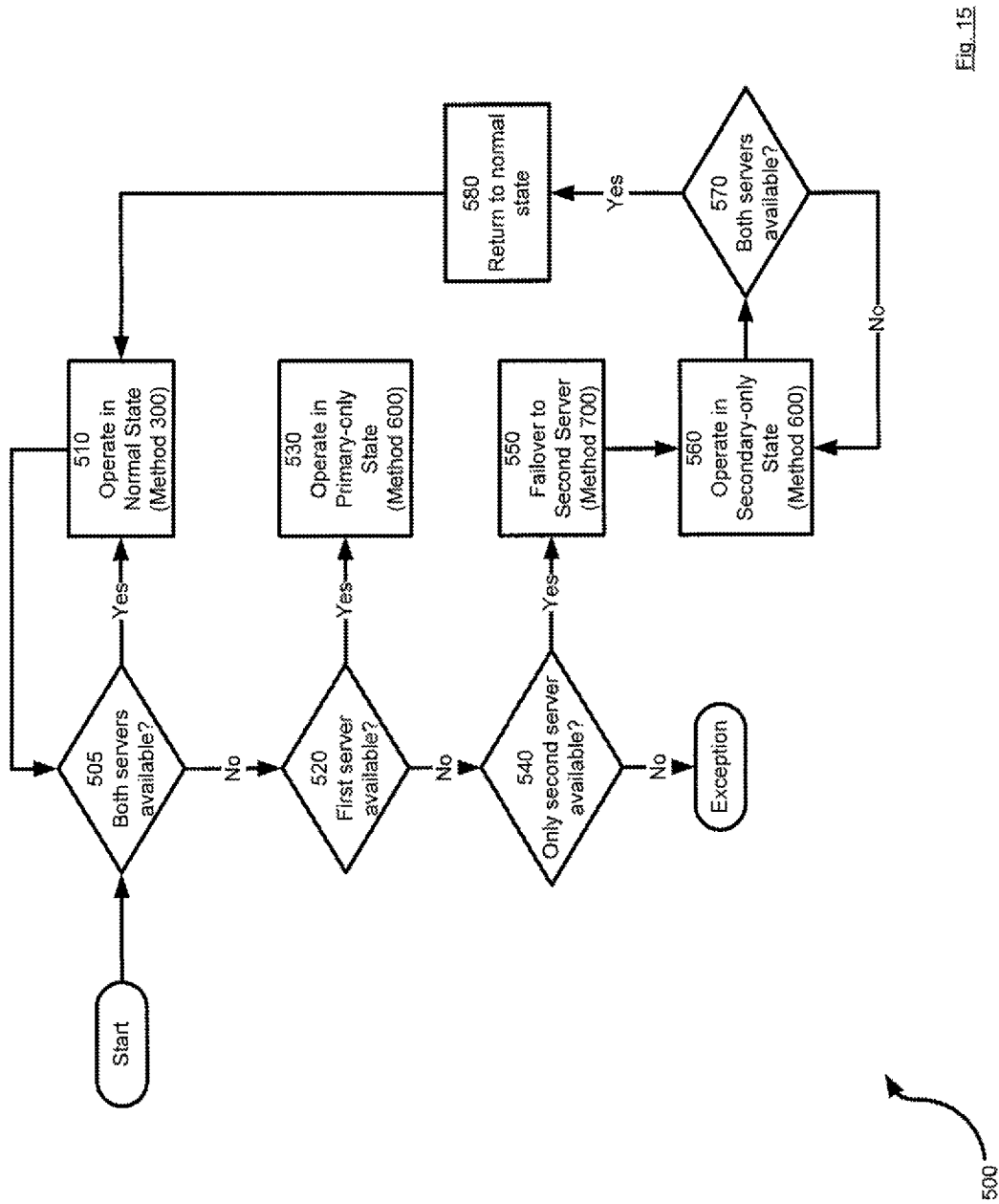
FIG. 15 is a flowchart representing a method for failover in accordance with another embodiment of the invention.

Since, in the normal state, server 62-2 maintains an up-to-date mirror of processing performed in server 62-1, a failure of server 62-1 can be quickly recovered by having server 62-2 assume the processing tasks of server 62-1 where server 62-1 left-off. FIG. 15 shows a flow-chart depicting a method 500 for managing a pair of servers where one of the servers is designated a primary server while the other server is designated a backup server. When implemented using system 50, at step 505 it is determined if both servers are available. Step 505 is implemented with the use of failover agents 90 and state registers 114. If yes, then step 505 advances to step 510 where system 50 operates in the normal state as previously described in relation to method 300. Step 505 and step 510 continue to cycle unless it is determined that both servers are not available in which case the method advances to step 520. At step 520 it is determined if only the first server is available. For example, if failover agent 90-1 cannot establish a connection, for whatever reason, with failover agent 90-2, then it is determined at step 520 that only the first server is available and method 500 will advance to step 530 at which point system 50 will operate in the primary-only state. Possible reasons for failover agent 90-1 being unable to establish a connection with failover agent 90-2 include, but are not limited to, server 62-2 experiencing a fatal crash, or the severing of link 78.

If the first server is not available, then method 500 advances from step 520 to step 540 where it is determined if only the second server is available. If not, then method 500 ends with an exception. However, if it is determined that the second server is available, then method 500 advances from step 540 to step 550. At step 550, system 50 fails over so that further processing is performed by the second server. Next, at step 560, operation continues as further processing is done in the secondary-only state. Method 500 then cycles between step 560 and 570 until both servers become available again, at which point method 500 advances to step 510 and system 50 is returned to the normal state.

Figure 16:
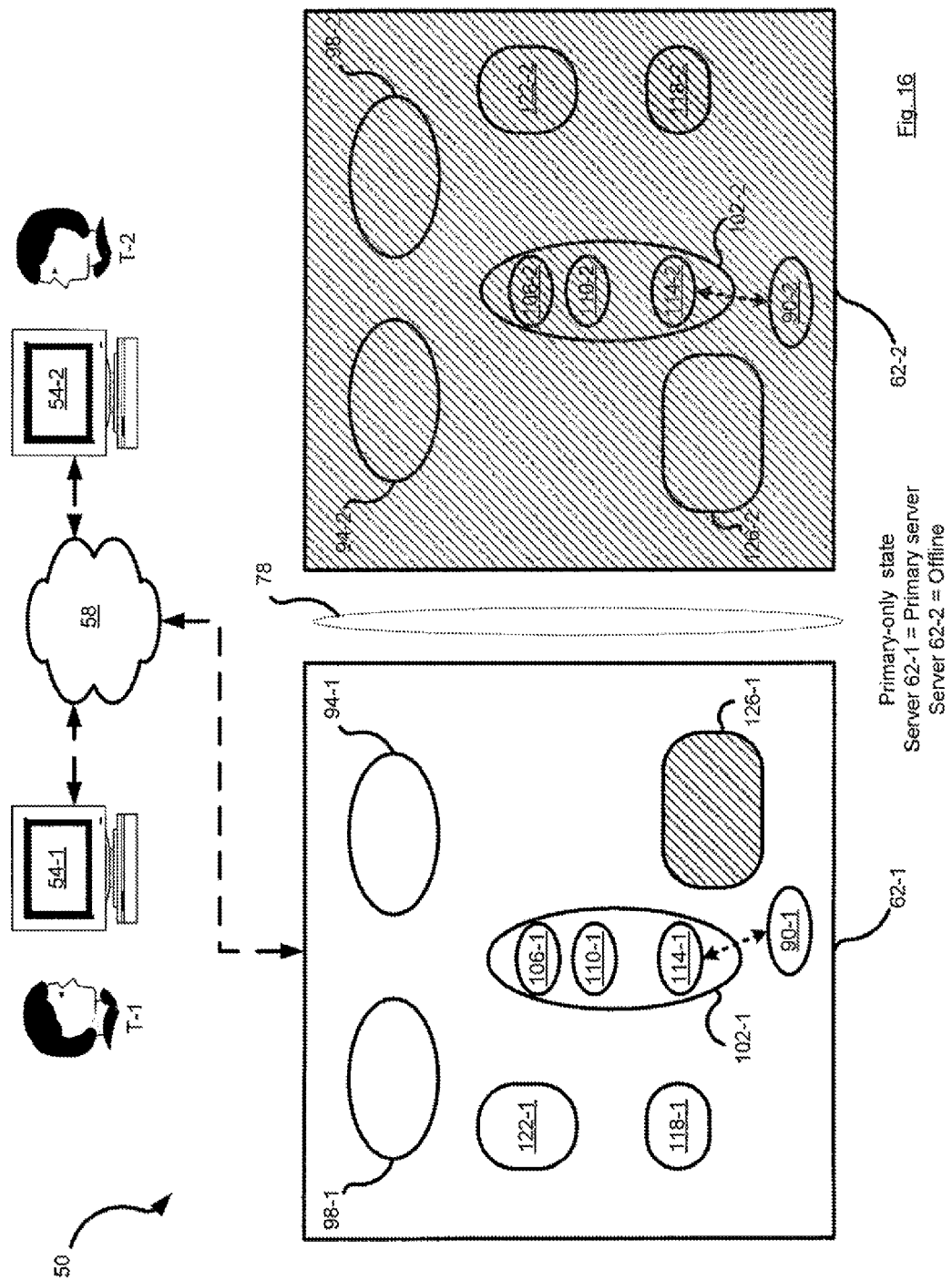
FIG. 16 shows the system of FIG. 2 with one of the servers operating in the primary-only state in accordance with another embodiment of the invention.

FIG. 16 shows an example of system 50 in the primary-only state, whereby server 62-1 is designated the primary server but server 62-2 is offline (or otherwise unavailable due to failure of link 78). In FIG. 16, since server 62-1 is operating in the primary-only state, state register 114-1 will indicate that server 62-1 is currently designated as the primary server and operating in the primary-only state.

Figure 17:
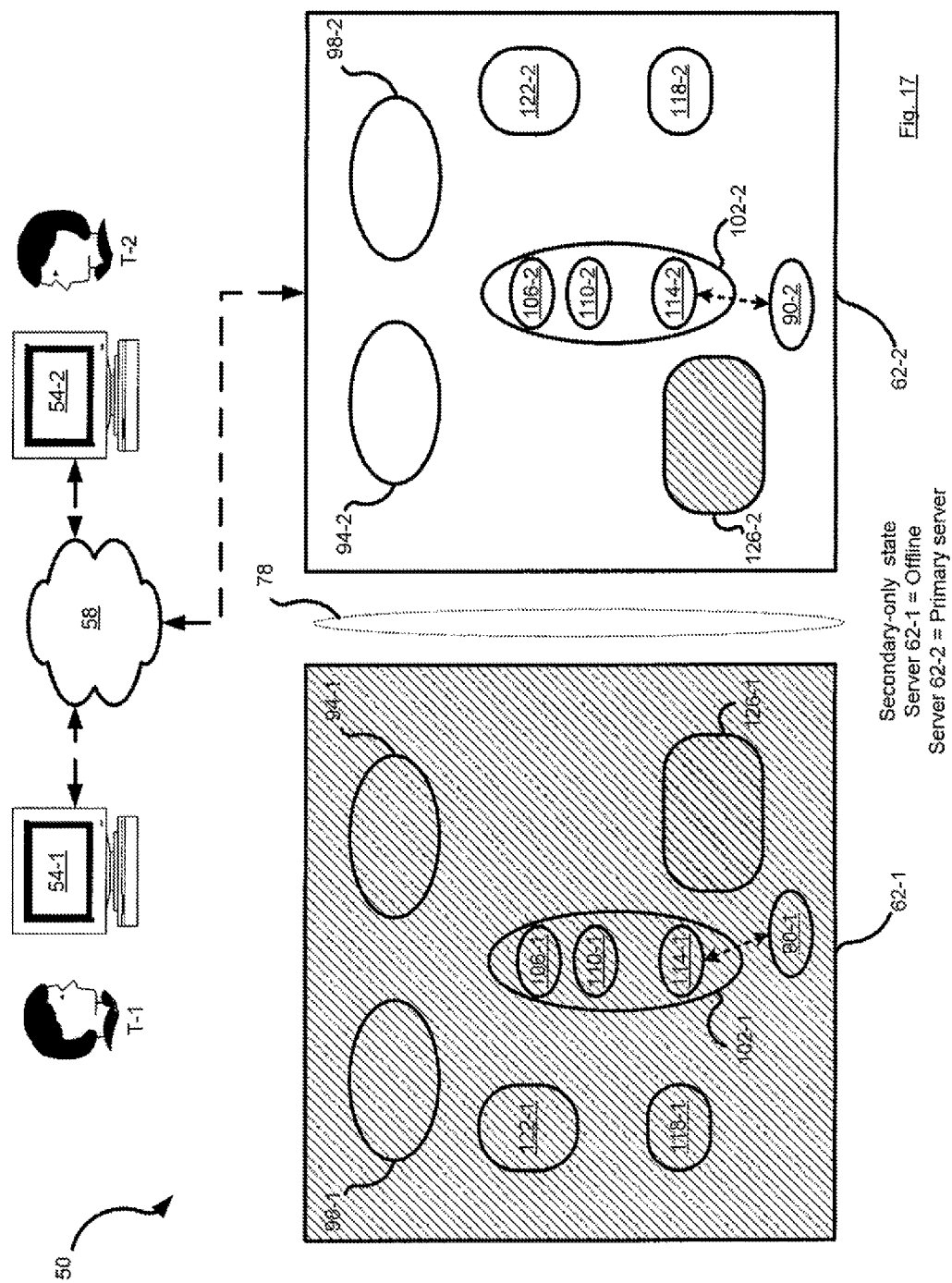
FIG. 17 shows the system of FIG. 16 with the other server operating in the primary-only state in accordance with another embodiment of the invention.

FIG. 17 shows an example of system 50 in the secondary-only state, whereby server 62-2 is designated the primary server but server 62-1 is offline. In FIG. 17, since server 62-2 is operating in the primary-only state, state register 114-2 will indicate that server 62-2 is currently designated as the primary server and operating in the primary-only state.

While not shown, note that system 50 could also be configured to be the normal state whereby server 62-2 is designated the primary server while server 62-1 is designated the backup server.

Figure 18:
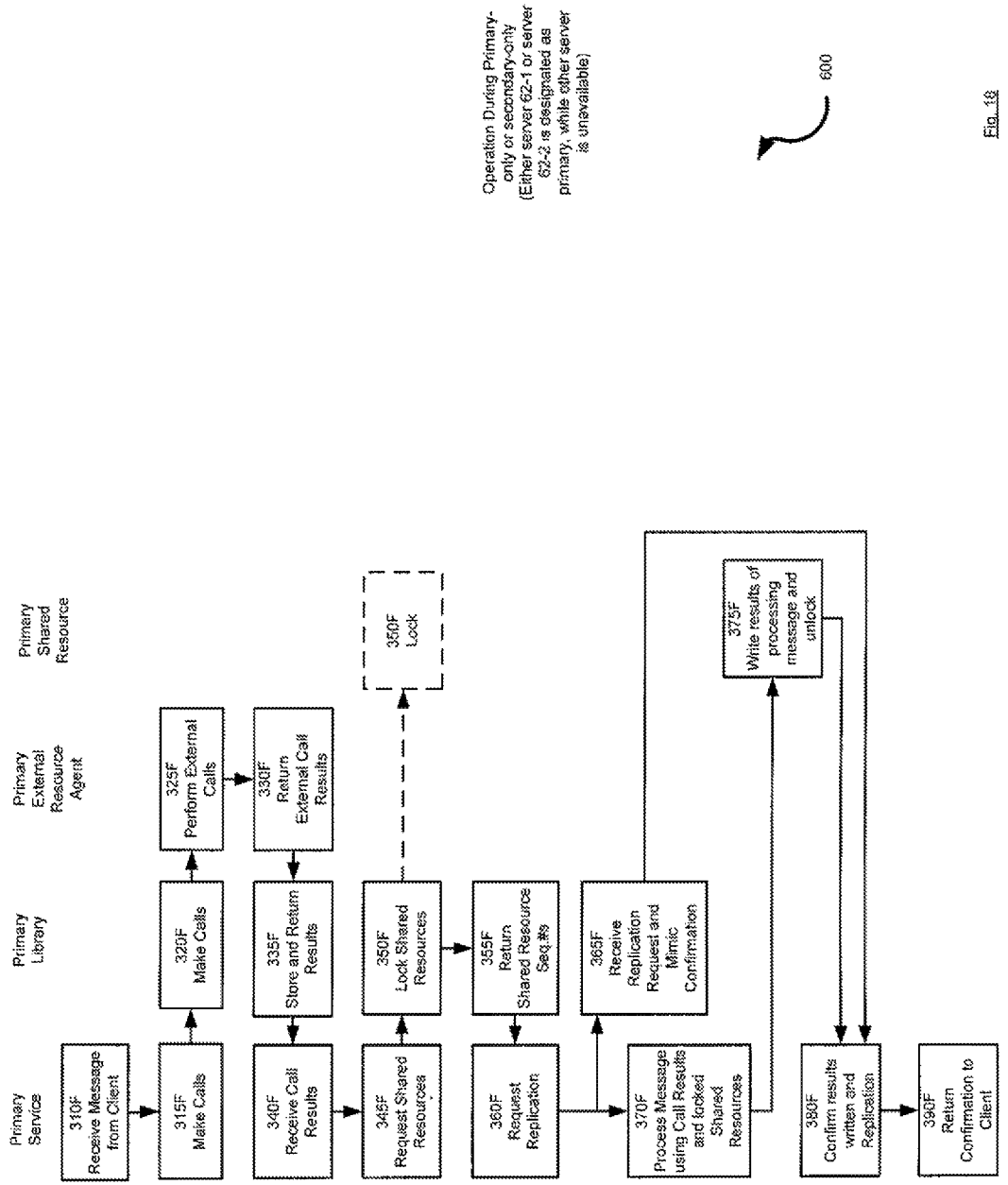
FIG. 18 is a flowchart representing a method for operating one of the servers in the primary-only state in accordance with another embodiment of the invention; and, FIG. 19 is a flowchart representing a method for failing over from the normal state to the backup server operating in the primary-only state in accordance with another embodiment of the invention.

FIG. 18 shows as flowchart depicting a method 600 for processing messages when only one of servers 62 is available. Method 600 would be performed by server 62-1 in step 530 of method 500, or it would be performed by server 62-2 in step 560 of method 500. Those skilled in the art will now appreciate that method 600 substantially reflects the operation of the primary server in method 300. More particularly, it can be noted that steps 310-360 and steps 370-390 of method 300 correspond to the counterparts in method 600 which bear the same numbers but are followed by the suffix "F". However, step 365F of method 680 is different from step 365 of method 300. Step 365F corresponds to step 430 of method 300, as at step 365F library 102 will respond to the request for replication from service 94 (or 98) by simply mimicking the confirmation that replication has been achieved, so that service 94 (or 98) will receive such confirmation at step 380F and allow method 600 to advance to step 390F.

FIG. 19 shows a flowchart, depicting a method 700 for failing over from a primary server to a backup server that can be used to implement step 550 of method 500. Method 700 could be performed, for example, by server 62-2 if failover agent 114-2 discovered that server 62-1 had failed (e.g. crashed or for whatever reason was no longer available.) Since clients 54 are already communicating with server 62-1, clients 54 will continue to interact with server 62-1, despite the fact that server 62-2 will assume that server 62-1 has failed and that server 62-2 will assume that it is the primary server. In that event, method 700 would begin at step 710 at which point the replication agent queue would be cleared. In the examples discussed above, server 62-2 would continue to process all data stored in replication agent 126-2 in accordance with step 405 (and subsequent steps 310S, 315S, 340S, 345S, 360S, 370S, 380S, 390S, 410, 415, 420, 425, 430 and 435) in order to clear out and duplicate processing of all messages (and associated external calls) that was being processed in server 62-1 before server 62-1 failed. In the event that the server 62-1 fails at step 370, server 62-2 may receive a duplicate message from the client executing a recovery protocol, such as, a gap recovery, or as another example, the type of recovery described in the Applicant's co-pending application as described in U.S. Published Application US20050138461. Since the client will never receive confirmation from server 62-1 that the message was processed. In this event, server 62-2 is configured to recognize duplicate messages and simply return the same response, without attempting to reprocess the same message.

Next, at step 720, the replication agent would be deactivated. In the present example, replication agent 126-2 would be deactivated, such that it would no longer maintain a queue of data received from server 62-1, or be configured to send messages to services 94-2 and 98-2. At step 730, the external resource agent and sequencer would be activated. In the present example, external resource agent 118-2 would become active so that it would be configured to make the external function calls shown in steps 325F and steps 330F of method 600. Likewise, sequence 106-2 so that it would be configured to assign sequence numbers shown in step 355F of method 600. Next, at step 740 the failover agent is set to indicate primary-only state. In the example, failover agent 114-2 is set to indicate primary-only state so that library 102-2 knows to operate in accordance with steps 320F, 335F, 350F, 355F, and 365F of method 600. Next, at step 720, the presence of the server is announced to the clients. In the present example, server 62-2 will announce to clients 54 over network 58 that server 62-2 is ready to accept and process messages from clients 54. The manner in which this is done is not particularly limited, and would substantially be the same manner in which server 62-1 would have announced itself to clients 54 prior to the commencement of method 300. The session protocol can perform a gap recovery so respective sides can re-send communications that the counter party may not have received. At this point, system 50 is in the state shown in FIG. 17, where server 62-2 is now designated as the primary server, and system 50 is ready to operate in the primary-only state with server 62-2 as the primary server. At this point the method can return to step 560 of method 500, whereby, messages from clients are received and processed in accordance with method 600.

While only specific combinations of the various features and components of the present invention have been discussed herein, it will be apparent to those of skill in the art that desired subsets of the disclosed features and components and/or alternative combinations of these features and components can be utilized, as desired. For example, while system 50 includes two servers 62-1 and 62-2 it is contemplated that any number of servers can be used. One server would be designated primary server, while any number of additional servers can be designated as backup servers and joined together, either serially or in parallel, using suitably modified teachings herein. Such additional servers would have substantially the same computing environment and structure as servers 62 disclosed herein, and in any event would have identical services that interact with libraries and other software elements to make external calls (in the case of primary server) on behalf of those services, or to provide replications of those external calls (in the case of backup servers) on behalf of the mirrored copies of those services.

It should also be understood that method 300 can be varied. For example, method 300 could be-configured to operate completely synchronously, whereby the primary server will only confirm to the client that a message has been processed provided that both the primary and secondary shared resources have been written-to with the results of the processing done by a particular service. This can be implemented by changing method 300 so step 400 is only performed once step 380S is performed.

The invention claimed is:

1. A system for failover comprising:
a primary server and at least one backup server;
said primary server configured to:
determine a plurality of processing inputs, wherein said plurality of processing inputs guarantees deterministic processing of said plurality of processing inputs by said primary server and said backup server, wherein said plurality of processing inputs includes a call result from an external resource, said external resource resident on said primary server; and
forward said plurality of processing inputs to said backup server prior to said primary server processing said plurality of processing inputs.

2. The system of claim 1, wherein said external resource is an operating system clock.

3. The system of claim 1, wherein said plurality of processing inputs comprise a request for a time stamp.

4. The system of claim 1, wherein said plurality of processing inputs further comprise a shared resource.

5. The system of claim 4, wherein said shared resource is maintained in random access memory of a respective server.

6. The system of claim 1, wherein said plurality of processing inputs further comprise a sequence number generated by said primary server.

7. The system of claim 1, wherein said backup server comprises a replication agent, said replication agent configured to communicate with a library of said primary server to facilitate mirroring of information from said primary server to said backup server.

8. The system of claim 1, wherein said backup server is configured to recognize a duplicate message from a client.

9. The system of claim 8, wherein said backup server is configured to execute a recovery protocol when said duplicate message from said client is received.

10. The system of claim 9, wherein said recovery protocol comprises sending a response, from said backup server based on mirrored information.

11. The system of claim 9, wherein said recovery protocol is a gap recovery, said gap recovery results of said plurality of processing inputs for sending to a respective client during a failover to a primary-only state using backup server.

12. The system of claim 1, wherein said primary server and said backup server operate synchronously.

13. A method for failover in a system comprising:
determining, at a primary server, a plurality of processing inputs, wherein said plurality of processing inputs guarantees deterministic processing of said plurality of processing inputs by said primary server and a backup server, wherein said plurality of processing inputs includes a call result from an external resource, said external resource resident on said primary server;
forwarding said plurality of processing inputs from said primary server to said backup server; and
processing, at said primary server, said plurality of processing inputs after forwarding said plurality of processing inputs.

14. The method of claim 13, wherein said external resource is an operating system clock.

15. The method of claim 13, wherein said plurality of processing inputs comprise a request for a time stamp.

16. The method of claim 13, wherein said plurality of processing inputs further comprise a shared resource.

17. The method of claim 13, wherein said plurality of processing inputs further comprise a sequence number generated by said primary server.

18. A non-transitory computer readable medium storing a set of programming instructions executable on one of at least two interconnected servers via a network, the set of programming instructions comprising:
- instructions for determining, at a primary server, a plurality of processing inputs, wherein said plurality of processing inputs guarantees deterministic processing of said plurality of processing inputs by said primary server and a backup server, wherein said plurality of processing inputs includes a call result from an external resource, said external resource resident on said primary server;
- instructions for forwarding said plurality of processing inputs from said primary server to said backup server; and
- instructions for processing, at said primary server, said plurality of processing inputs after forwarding said plurality of processing inputs.

* * * * *